(12) United States Patent
O'Meara et al.

(10) Patent No.: US 12,345,271 B2
(45) Date of Patent: *Jul. 1, 2025

(54) FOIL BEARING ASSEMBLY INCLUDING PERFORATED INNER FOIL ASSEMBLY AND COMPRESSOR INCLUDING SAME

(71) Applicant: Copeland LP, Sidney, OH (US)

(72) Inventors: Patrick Shawn O'Meara, Tipp City, OH (US); Michael M. Perevozchikov, Tipp City, OH (US); Zheji Liu, Tipp City, OH (US)

(73) Assignee: Copeland LP, Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,780

(22) Filed: Nov. 15, 2023

(65) Prior Publication Data

US 2024/0254998 A1 Aug. 1, 2024

Related U.S. Application Data

(63) Continuation of application No. 18/162,396, filed on Jan. 31, 2023, now Pat. No. 11,852,153.

(51) Int. Cl.
*F16C 17/02* (2006.01)
*F04D 29/05* (2006.01)
(Continued)

(52) U.S. Cl.
CPC .......... *F04D 29/057* (2013.01); *F16C 17/024* (2013.01); *F16C 43/02* (2013.01); *F16C 2360/00* (2013.01); *F25B 31/026* (2013.01)

(58) Field of Classification Search
CPC ........ F16C 17/024; F16C 27/02; F16C 43/02; F16F 1/028; F04D 29/057
See application file for complete search history.

(56) References Cited

U.S. PATENT DOCUMENTS

| | | | |
|---|---|---|---|
| 4,247,155 A | 1/1981 | Fortmann | |
| 4,549,821 A | 10/1985 | Kawakami | |

(Continued)

FOREIGN PATENT DOCUMENTS

| | | |
|---|---|---|
| CN | 113503319 A | 10/2021 |
| EP | 3171047 A1 | 5/2017 |

OTHER PUBLICATIONS

International Search Report and Written Opinion from Application No. PCT/US2023/084016, dated Mar. 27, 2024 (15 pages).

*Primary Examiner* — Deming Wan
(74) *Attorney, Agent, or Firm* — Armstrong Teasdale LLP

(57) ABSTRACT

A bearing system includes a bearing housing and a foil bearing assembly. The bearing housing includes a sleeve defining a cylindrical bore, and a mounting structure for connecting the bearing system to a compressor housing. The foil bearing assembly is positioned within the cylindrical bore and includes an inner foil assembly and a bump foil assembly. The bump foil assembly includes a plurality of bump foils disposed circumferentially about the inner foil assembly. Each bump foil is spaced circumferentially from an adjacent bump foil to define a gap therebetween. The inner foil assembly includes a cylindrical inner surface defining a plurality of perforations extending radially therethrough. Each perforation is radially aligned with one of the gaps between adjacent bump foils.

18 Claims, 21 Drawing Sheets

(51) Int. Cl.
   *F04D 29/057*   (2006.01)
   *F16C 1/02*   (2006.01)
   *F16C 43/02*   (2006.01)
   *F25B 31/02*   (2006.01)

(56) References Cited

U.S. PATENT DOCUMENTS

| | | | |
|---|---|---|---|
| 4,701,060 | A | 10/1987 | Gu |
| 5,498,083 | A * | 3/1996 | Brown ................ F16C 17/024 384/106 |
| 8,419,283 | B2 * | 4/2013 | McAuliffe ........... F16C 17/024 384/106 |
| 8,500,331 | B2 | 8/2013 | Kim et al. |
| 8,602,653 | B2 | 12/2013 | Heshmat |
| 9,394,941 | B2 | 7/2016 | Ryu |
| 9,732,789 | B2 | 8/2017 | McAuliffe et al. |
| 9,976,595 | B2 * | 5/2018 | Kim .................... F16C 32/0622 |
| 10,352,356 | B2 | 7/2019 | Yoshino et al. |
| 10,371,198 | B2 * | 8/2019 | McAuliffe ........... F16C 17/024 |
| 10,480,568 | B2 | 11/2019 | Yoshino |
| 10,781,853 | B2 * | 9/2020 | Omori .................. F16C 27/02 |
| 11,181,141 | B2 * | 11/2021 | Lee ...................... F16C 17/024 |
| 2016/0091015 | A1 | 3/2016 | McAuliffe et al. |
| 2018/0051745 | A1 * | 2/2018 | Himmelmann ....... F01D 25/162 |
| 2020/0291953 | A1 | 9/2020 | Perevozchikov et al. |
| 2022/0243762 | A1 | 8/2022 | Liu et al. |

* cited by examiner

FOIL BEARING ASSEMBLY INCLUDING PERFORATED INNER FOIL ASSEMBLY AND COMPRESSOR INCLUDING SAME

CROSS-REFERENCE TO RELATED APPLICATION

This application is a continuation of and claims priority to U.S. patent application Ser. No. 18/162,396, filed Jan. 31, 2023, the entire contents and disclosure of which are incorporated by reference in its entirety.

FIELD

The field relates to bearing systems, and more particularly, to gas foil bearing assemblies for use in compressors.

BACKGROUND

Some refrigerants used in modern refrigeration and cooling systems, such as R134a or other low global warming potential (GWP) refrigerants, have a relatively low density and require higher volume flow compressors, such as centrifugal compressors.

Centrifugal compressors typically include bearings to support a rotor that imparts kinetic energy to incoming refrigerant. The rotor can include a rotating shaft that transmits power from the motor to an additional rotor component, such as an impeller. The compressor bearings are typically provided with one or more features to improve the robustness of the bearing system. Some compressor bearings in existing refrigerant compressors use oil or alternative compositions as a lubricant, but some refrigerants are incompatible with at least some existing lubricant compositions. Other compressor bearings are oil-free magnetic bearings that levitate the rotor within a magnetic field provided by high-strength magnets. However, magnetic bearings are typically complex in design, add significant weight, require complicated control, and limit the choice of rotor materials to ferromagnetic materials that respond to the magnetic fields within the magnetic bearings. Another type of oil-free bearing is a foil bearing that includes compliant foil elements that surround and support the rotor on a gas film. The gas film is formed between the rotor and the foil elements when the rotation speed of the shaft exceeds a threshold speed termed liftoff speed. Foil bearings are well-suited for the high-speed operating environment typical of centrifugal compressors, are compatible with all refrigerant compositions, and may be used with a wider variety of rotor materials.

At least one consideration when using foil bearing assemblies in centrifugal compressors is sub-synchronous vibrations—i.e., vibrations occurring at a frequency below that of the rotational frequency of the rotor supported by the bearings.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a bearing system includes a bearing housing and a foil bearing assembly. The bearing housing includes a sleeve defining a cylindrical bore, and a mounting structure for connecting the bearing system to a compressor housing. The foil bearing assembly is positioned within the cylindrical bore and includes an outer foil assembly, an inner foil assembly, and a bump foil assembly positioned between the outer foil assembly and the inner foil assembly. The bump foil assembly includes a plurality of bump foils disposed circumferentially about the inner foil assembly. Each bump foil is coupled to the outer foil assembly at a respective land and is spaced circumferentially from an adjacent bump foil to define a gap therebetween. The inner foil assembly is disposed radially inward from the outer foil assembly and includes a cylindrical inner surface defining a plurality of openings extending radially therethrough. Each of the plurality of openings is radially aligned with one of the lands or one of the gaps between adjacent bump foils.

In another aspect, a foil bearing assembly includes an outer foil assembly, an inner foil assembly, and a bump foil assembly positioned between the outer foil assembly and the inner foil assembly. The bump foil assembly includes a plurality of bump foils disposed circumferentially about the inner foil assembly. Each bump foil is coupled to the outer foil assembly at a land and is spaced circumferentially from an adjacent bump foil to define a gap therebetween. The inner foil assembly is disposed radially inward from the outer foil assembly and includes a cylindrical inner surface defining a plurality of openings extending radially therethrough. Each of the plurality of openings is radially aligned with one of the lands or one of the gaps between adjacent bump foils.

In another aspect, a compressor includes a compressor housing, a shaft rotatably supported within the compressor housing, an impeller connected to the shaft and operable to impart kinetic energy to incoming refrigerant gas upon rotation of the shaft, a bearing housing mounted to the compressor housing, and a foil bearing assembly rotatably supporting the shaft. The bearing housing includes a sleeve defining a cylindrical bore. The foil bearing assembly is positioned within the cylindrical bore and includes an outer foil assembly, an inner foil assembly, and a bump foil assembly positioned between the outer foil assembly and the inner foil assembly. The bump foil assembly includes a plurality of bump foils disposed circumferentially about the inner foil assembly. Each bump foil is coupled to the outer foil assembly at a land and is spaced circumferentially from an adjacent bump foil to define a gap therebetween. The inner foil assembly is disposed radially inward from the outer foil assembly and includes a cylindrical inner surface defining a plurality of openings extending radially therethrough. Each of the plurality of openings is radially aligned with one of the lands or one of the gaps between adjacent bump foils.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
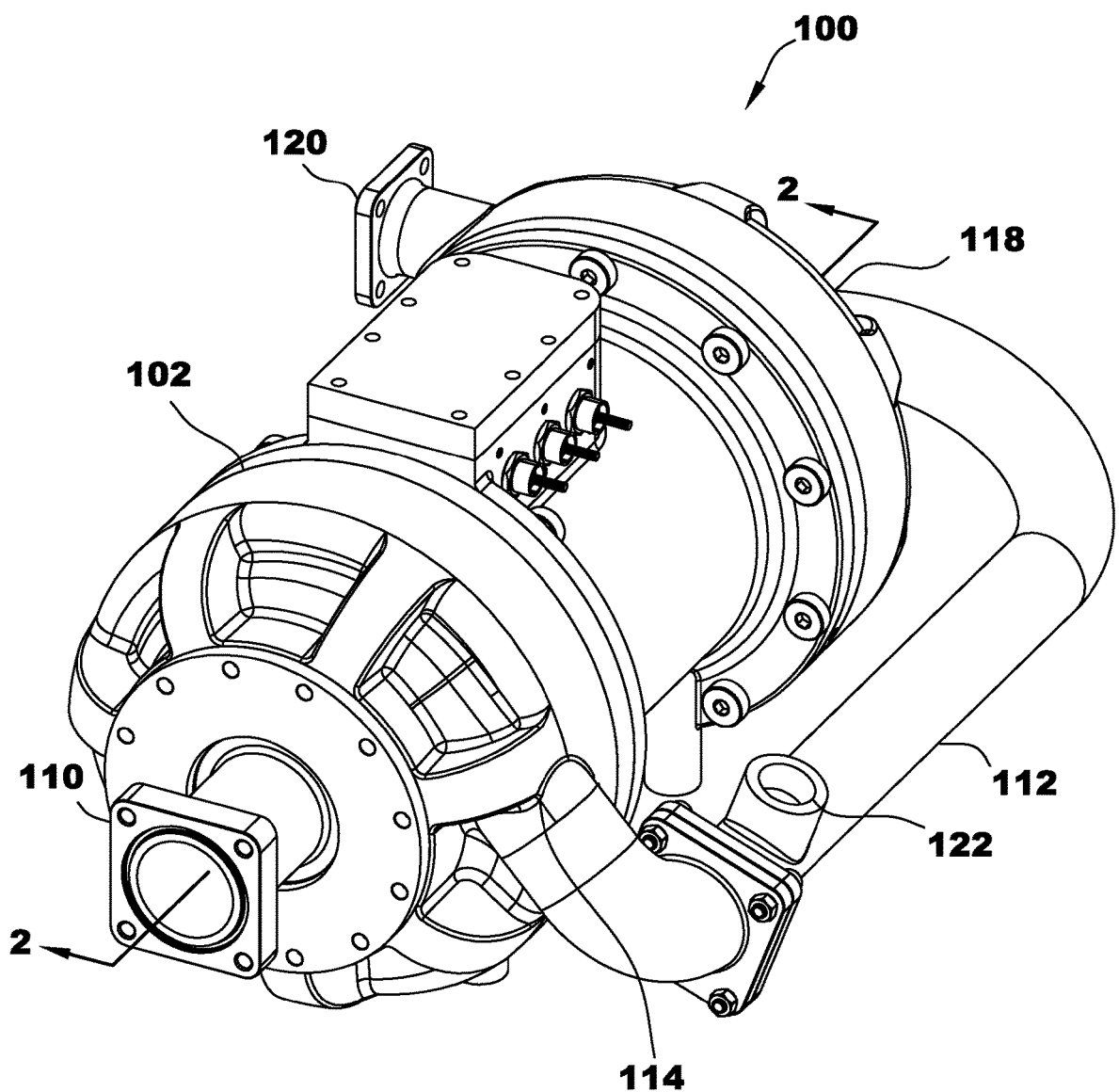
FIG. 1 is a perspective view of an assembled compressor.

Referring to FIG. 1, a compressor illustrated in the form of a two-stage refrigerant compressor is indicated generally at 100. The compressor 100 generally includes a compressor housing 102 forming at least one sealed cavity within which each stage of refrigerant compression is accomplished. The compressor 100 includes a first refrigerant inlet 110 to introduce refrigerant vapor into the first compression stage (not labeled in FIG. 1), a first refrigerant exit 114, a refrigerant transfer conduit 112 to transfer compressed refrigerant from the first compression stage to the second compression stage, a second refrigerant inlet 118 to introduce refrigerant vapor into the second compression stage (not labeled in FIG. 1), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated. The refrigerant transfer conduit 112 may further include a refrigerant port 122, for example, for economization.

Figure 2:
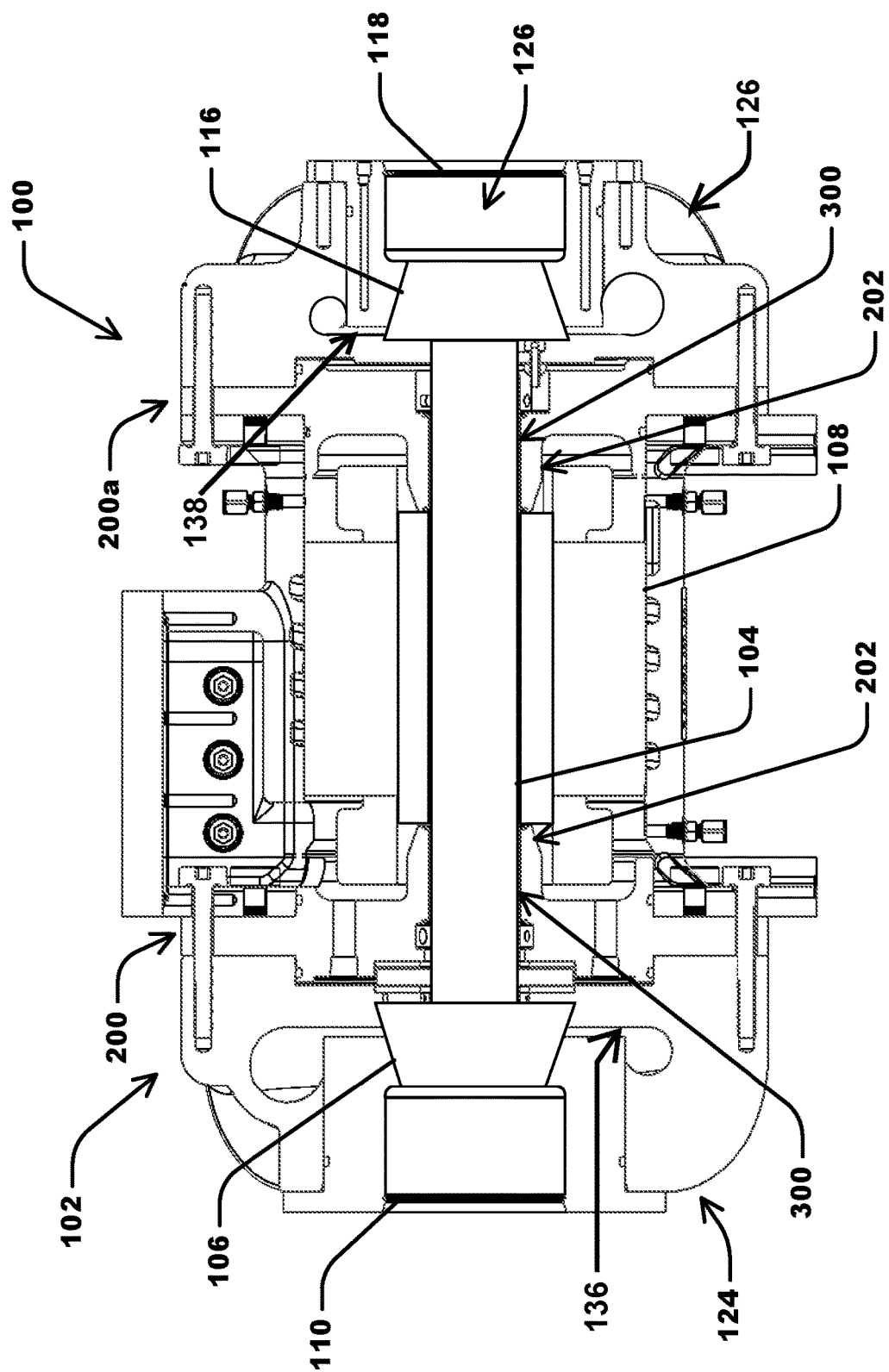
FIG. 2 is a cross-sectional view of the compressor of FIG. 1 taken along line 2-2, with the external conduit removed.

Referring to FIG. 2, the compressor housing 102 encloses a first compression stage 124 and a second compression stage 126 at opposite ends of the compressor 100. The first compression stage 124 includes a first stage impeller 106 operable to impart kinetic energy to refrigerant entering via the first refrigerant inlet 110. The kinetic energy imparted to the refrigerant by the first stage impeller 106 is converted to increased refrigerant pressure (i.e. compression) as the refrigerant velocity is slowed upon transfer to a diffuser 136. Similarly, the second compression stage 126 includes a second stage impeller 116 operable to impart kinetic energy to refrigerant transferred from the first compression stage 124 entering via the second refrigerant inlet 118. The kinetic energy imparted to the refrigerant by the second stage impeller 116 is converted to increased refrigerant pressure (i.e. compression) as the refrigerant velocity is slowed upon transfer to a diffuser 138. Compressed refrigerant exits the second compression stage 126 via the second refrigerant exit 120 (not shown in FIG. 2).

Figure 3:
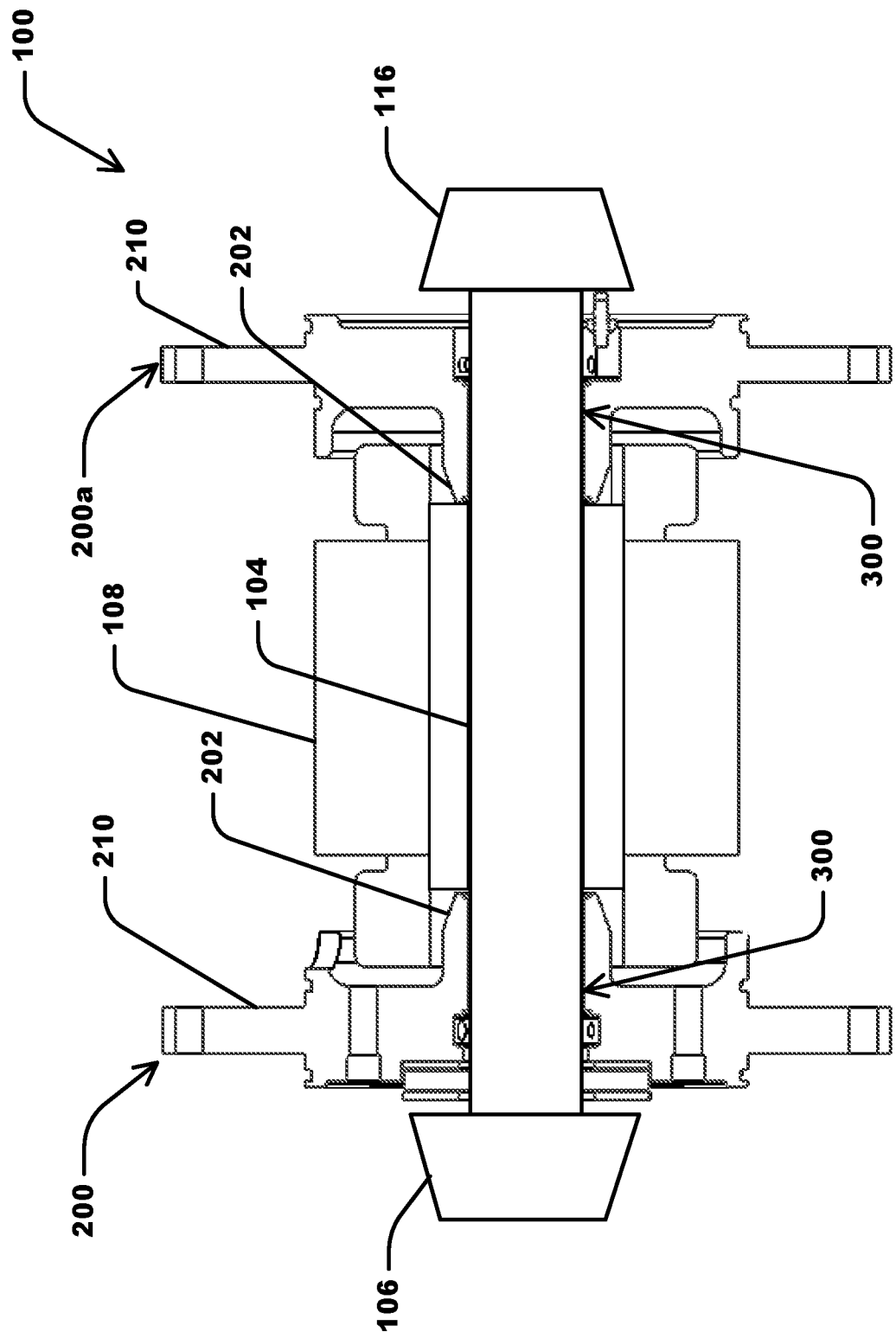
FIG. 3 is a cross-sectional view of the compressor of FIG. 2 with the external compressor housing removed.

Referring to FIG. 2 and FIG. 3, the first stage impeller 106 and second stage impeller 116 are connected at opposite ends of a shaft 104 supported within the compressor housing. The shaft 104, first stage impeller 106, and second stage impeller 116 are joined together to form a single rotor in the illustrated embodiment and may be collectively referred to herein as a rotor. The shaft 104 is operatively connected to a motor 108 positioned between the first stage impeller 106 and second stage impeller 116 such that the first stage impeller 106 and second stage impeller 116 are rotated at a rotation speed selected to compress the refrigerant to a pre-selected pressure exiting the second refrigerant exit 120. Any suitable motor may be incorporated into the compressor 100 including, but not limited to, an electrical motor. The shaft 104 is rotatably supported by gas foil bearing assemblies 300 positioned within a sleeve 202 of each bearing housing 200/200a, as described in additional detail below. Each bearing housing 200/200a includes a mounting structure 210 for connecting the respective bearing housing 200/200a to the compressor housing 102, as illustrated in FIG. 2.

Figure 4:
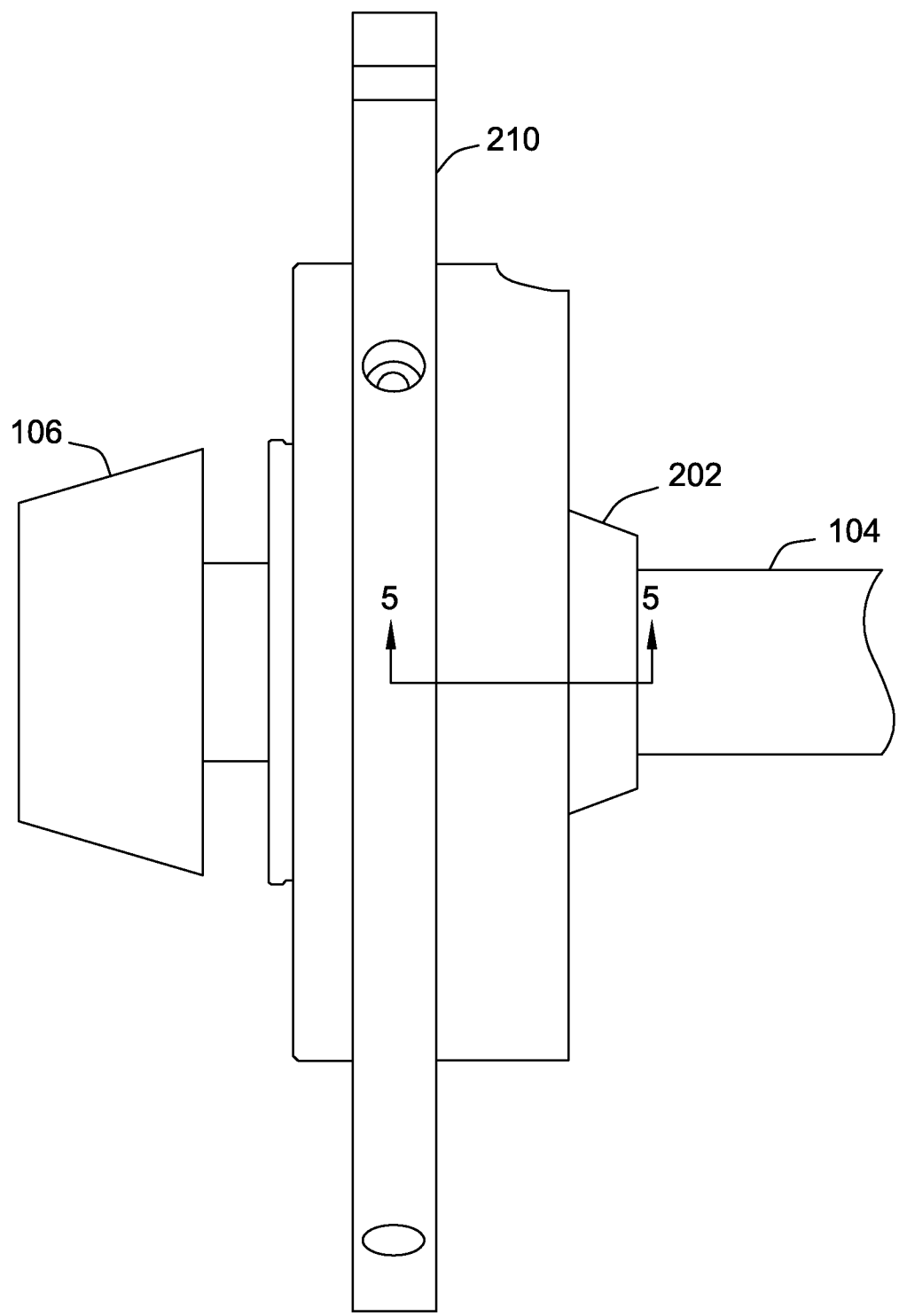
FIG. 4 is a side view of an impeller mounted to an end of a shaft in which the shaft is supported by a bearing housing.
Figure 5:
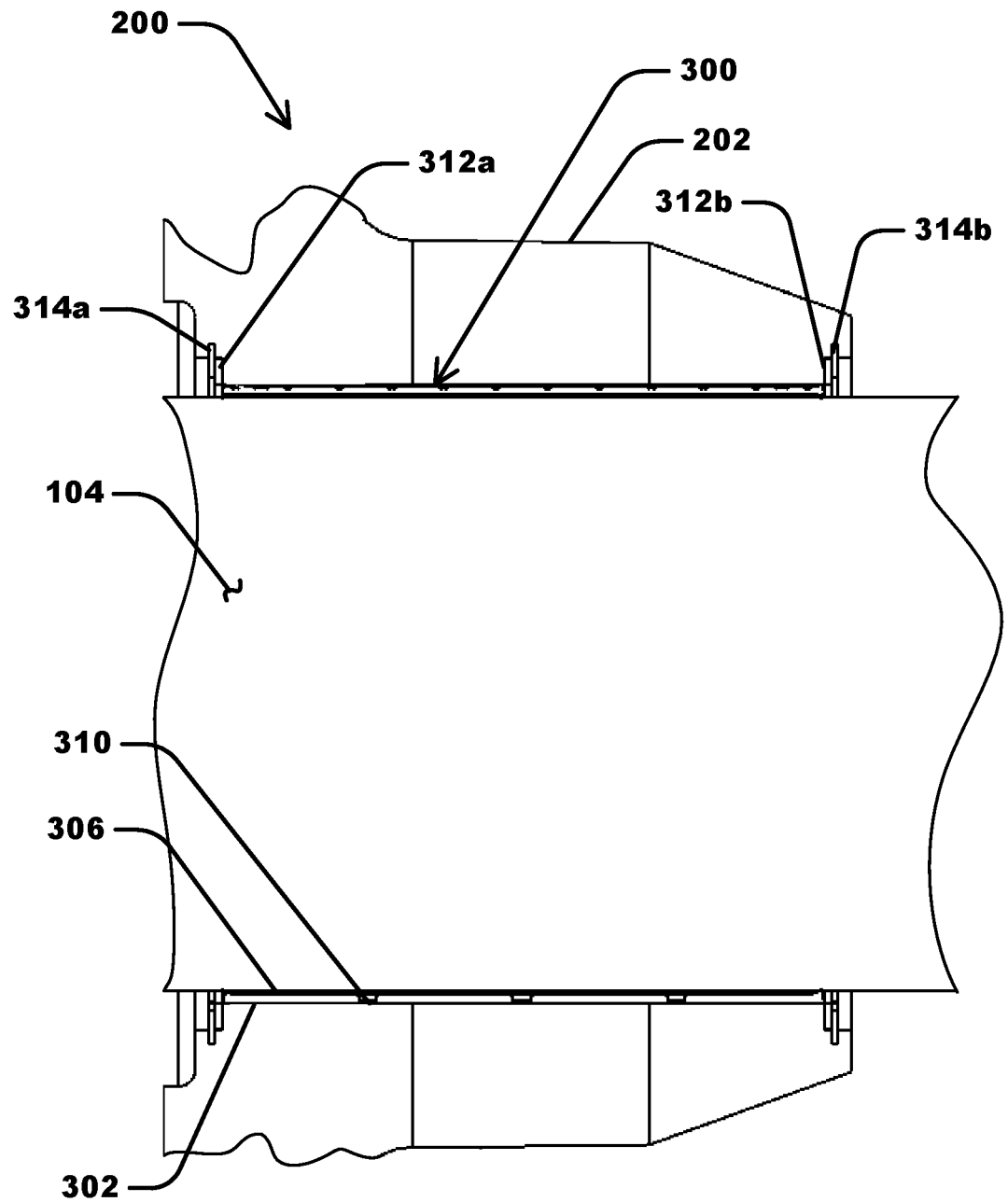
FIG. 5 is a cross-sectional view through a sleeve of the bearing housing shown in FIG. 4 taken along line 5-5, illustrating the shaft rotatably supported within a foil bearing assembly maintained within the sleeve of the bearing housing using a pair of retaining clips.
Figure 7:
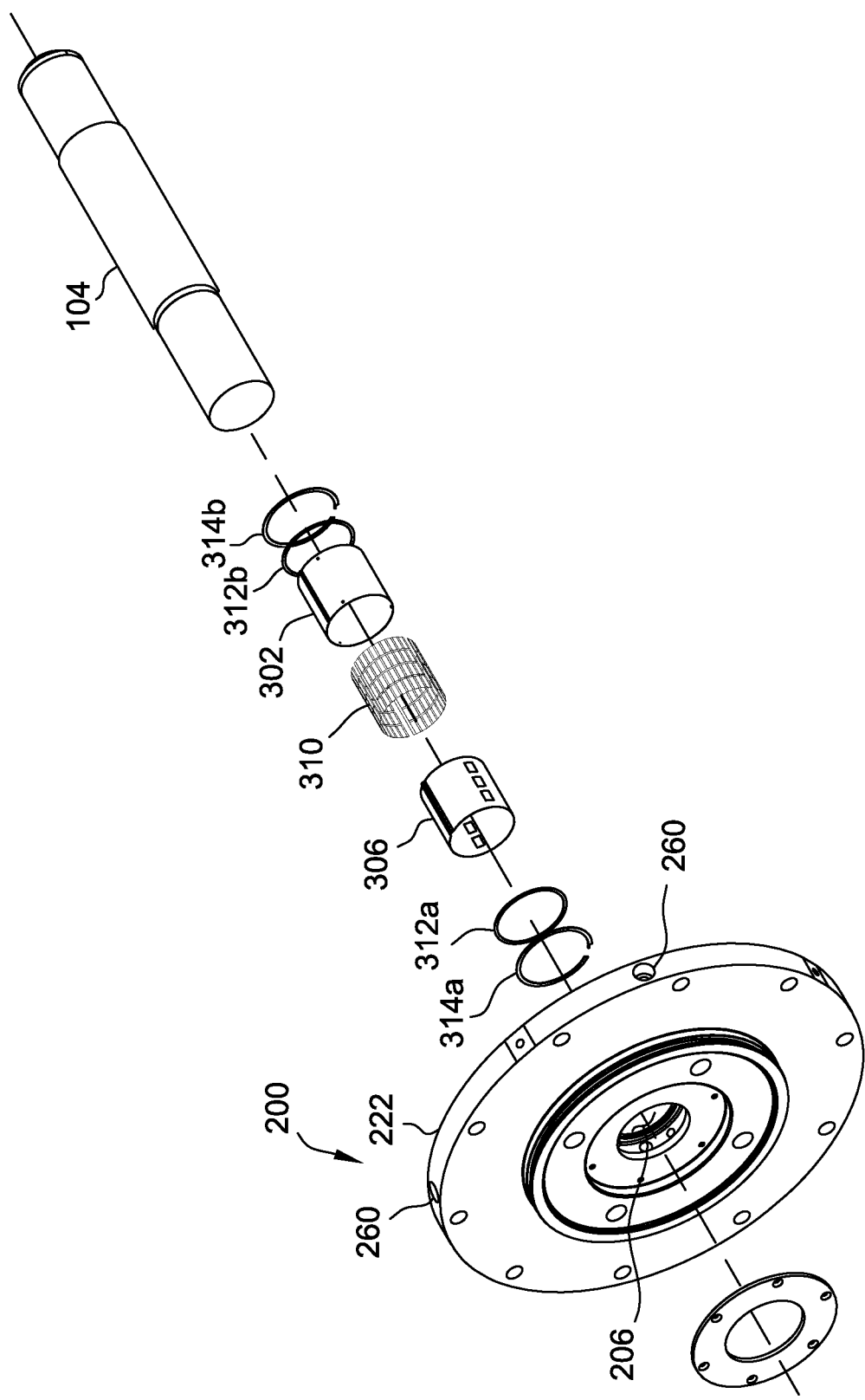
FIG. 7 is an exploded view showing the arrangement of elements of the foil bearing assembly with respect to the bearing housing and the shaft.

Referring to FIG. 4, each bearing housing 200/200a (only bearing housing 200 illustrated in FIG. 4) supports the shaft 104, and the shaft 104 projects through the bearing housing 200/200a opposite the sleeve 202, and the impeller 106/116 (only first stage impeller 106 illustrated in FIG. 4) is connected to the projecting end of the shaft 104. Referring to FIG. 5 and FIG. 7, a gas foil bearing assembly 300 is positioned within a cylindrical bore 206 within the bearing housing 200. The shaft 104 closely fits within the gas foil bearing assembly 300, which includes a compliant outer foil assembly 302 or foil layer positioned adjacent to the inner wall of the sleeve 202, a compliant inner foil assembly 306 or foil layer (also referred to as a "top foil") positioned adjacent to the shaft 104, and a bump foil assembly 310 or foil layer positioned between the inner foil assembly 306 and the outer foil assembly 302. The foil assemblies or layers 302/306/310 of the gas foil bearing assembly 300 form an essentially cylindrical tube sized to receive the shaft 104 with relatively little or no gap design as determined by existing foil bearing design methods. The components of the foil bearing assembly 300, such as the outer foil assembly 302, the inner foil assembly 306, and the bump foil assembly 310, may be constructed of any suitable material that enables the foil bearing assembly 300 to function as described herein. Suitable materials include, for example and without limitation, metal alloys. In some embodiments, for example, each of the outer foil assembly 302, the inner foil assembly 306, and the bump foil assembly 310 is constructed of stainless steel (e.g., 17-4 stainless steel). The foil assemblies can be formed from relatively thin sheets or "foils" of material. For example, the foil assemblies or layers 302/306/310 can be constructed of metal sheets having a thickness in the range of 0.003 inches to 0.007 inches.

Figure 8:
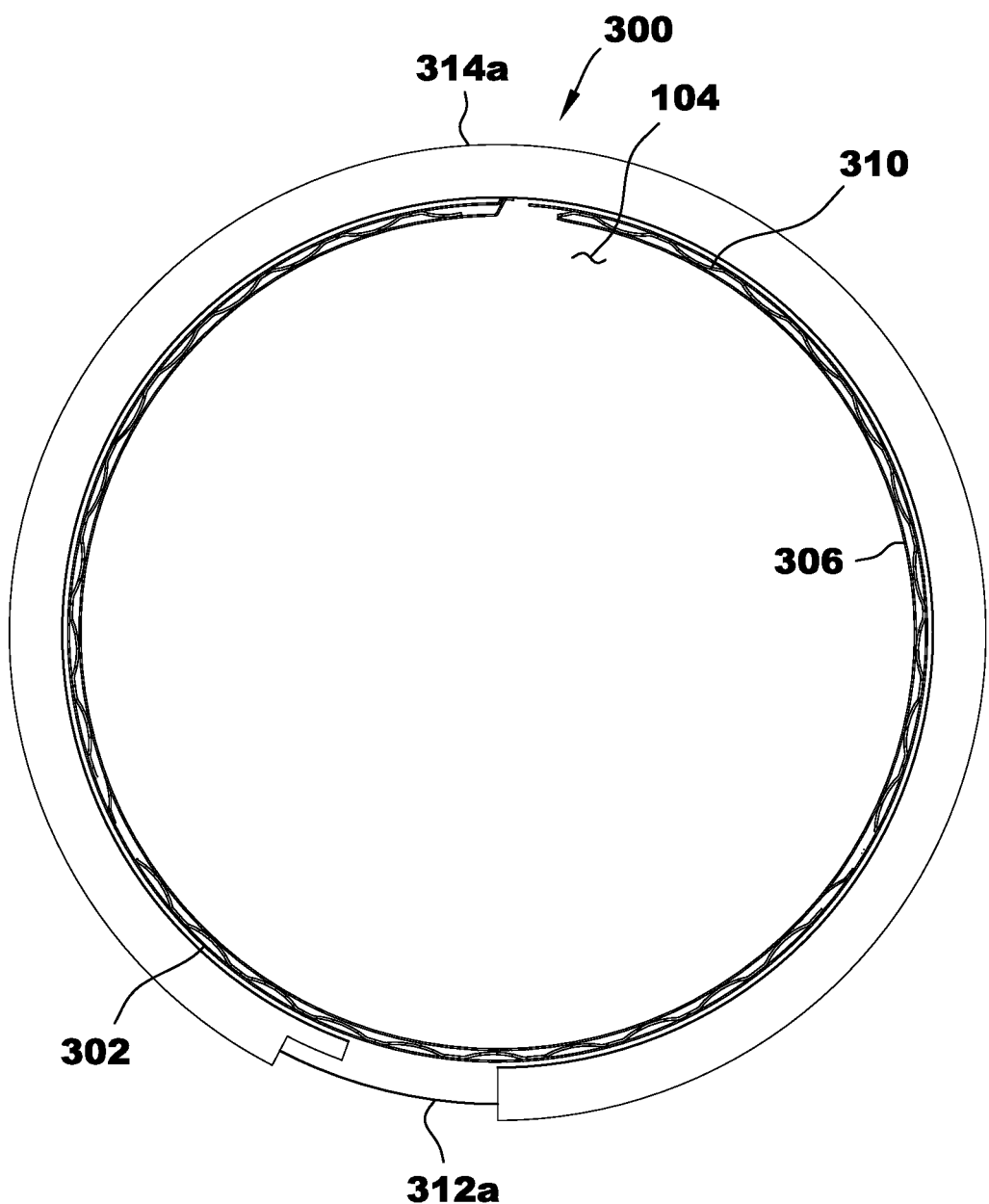
FIG. 8 is a front view of the foil bearing assembly shown in FIGS. 5 and 7.

Referring again to FIG. 5, the foil bearing assembly 300 in the illustrated embodiment further includes a pair of foil keepers 312a/312b positioned adjacent opposite ends of the layers 302/306/310 to inhibit sliding of the layers 302/306/310 in an axial direction within the cylindrical bore 206 of the sleeve 202. A pair of foil retaining clips 314a/314b positioned adjacent to the foil keepers 312a/312b, respectively, fix the layers 302/306/310 in a locked axial position within the cylindrical bore 206. Foil retaining clips 314a/314b may be removably connected to bearing housing 200. FIG. 8 further illustrates the arrangement of the foil keeper 312a and foil retaining clip 314a at one end of the foil bearing assembly 300.

Figure 6:
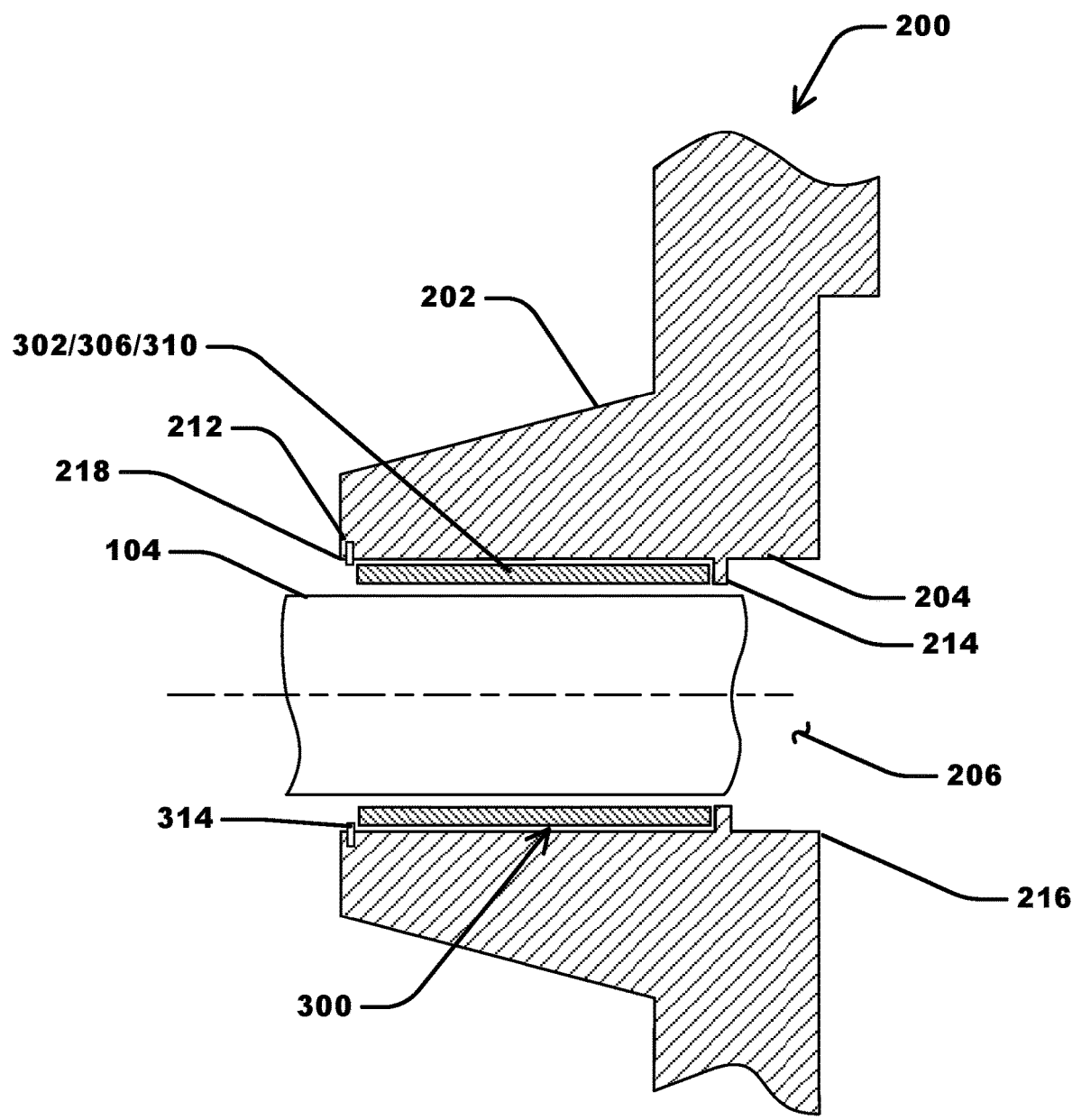
FIG. 6 is a cross-sectional view of another embodiment of a bearing housing suitable for use in the compressor of FIG. 1, illustrating the shaft supported within a foil bearing assembly maintained within the bearing housing between a retaining lip formed within the bearing housing at one end and a retaining clip at an opposite end.

In other embodiments, as illustrated in FIG. 6, each bearing housing 200/200a (only bearing housing 200 illustrated in FIG. 6) includes a foil retaining lip 214 formed integrally (e.g., cast) with the bearing housing 200 and projecting radially inward from the radial inner surface 204 that defines the cylindrical bore 206. In the illustrated embodiment, the foil retaining lip 214 is positioned near an impeller end 216 of the cylindrical bore 206 proximal to the second stage impeller 116 (shown in FIGS. 2-3). The foil retaining lip 214 is sized and dimensioned to project a radial distance from the radial inner surface 204 that overlaps at least a portion of the layers 302/306/310 of the foil bearing assembly 300. The foil retaining lip 214 may extend fully around the circumference of the radial inner surface 204, or the foil retaining lip can include two or more segments extending over a portion of the circumference of the radial inner surface 204 and separated by spaces flush with the adjacent radial inner surface 204.

Figure 9:
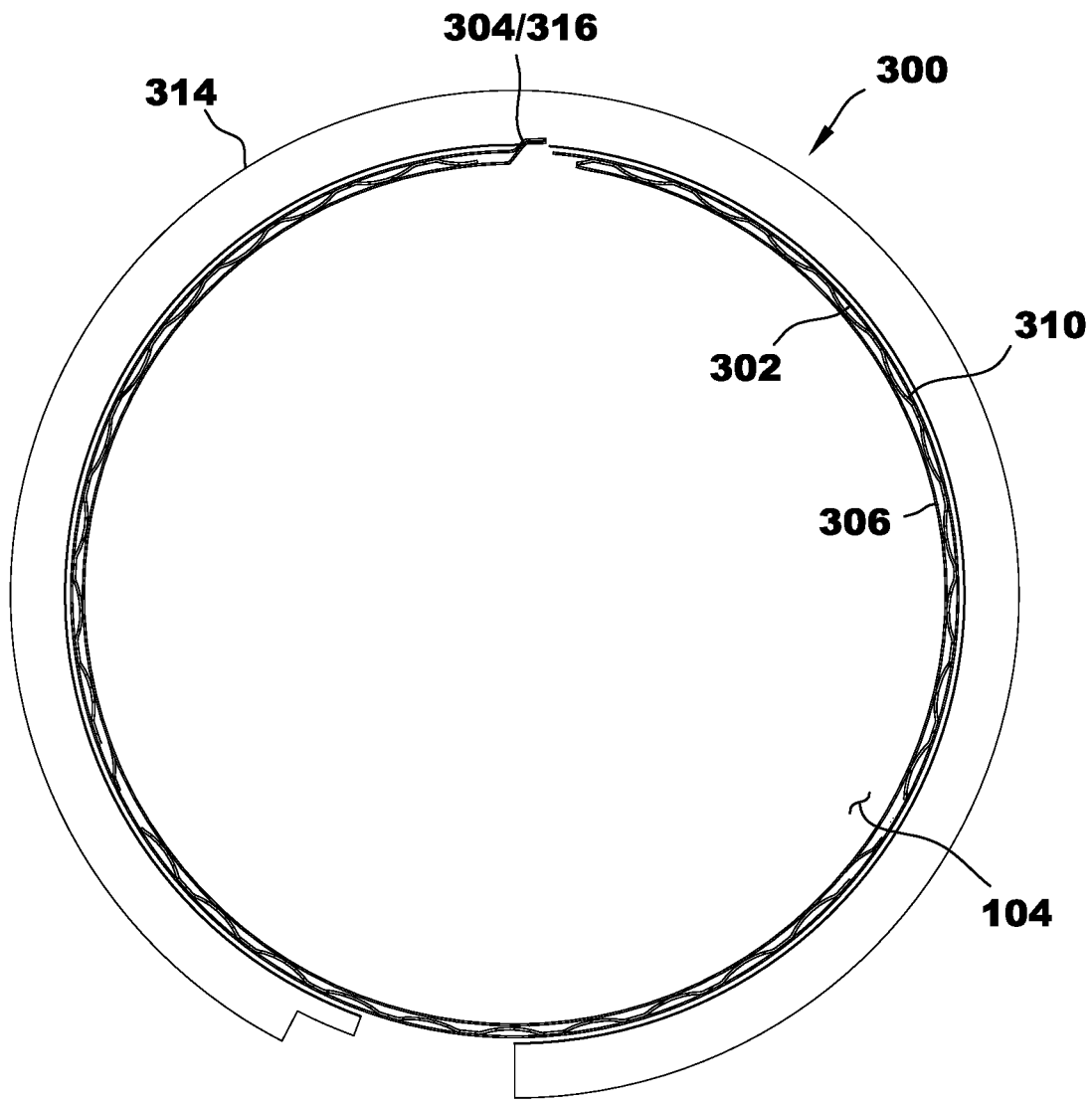
FIG. 9 is a front view of the foil bearing assembly shown in FIGS. 6 and 7.
Figure 10:
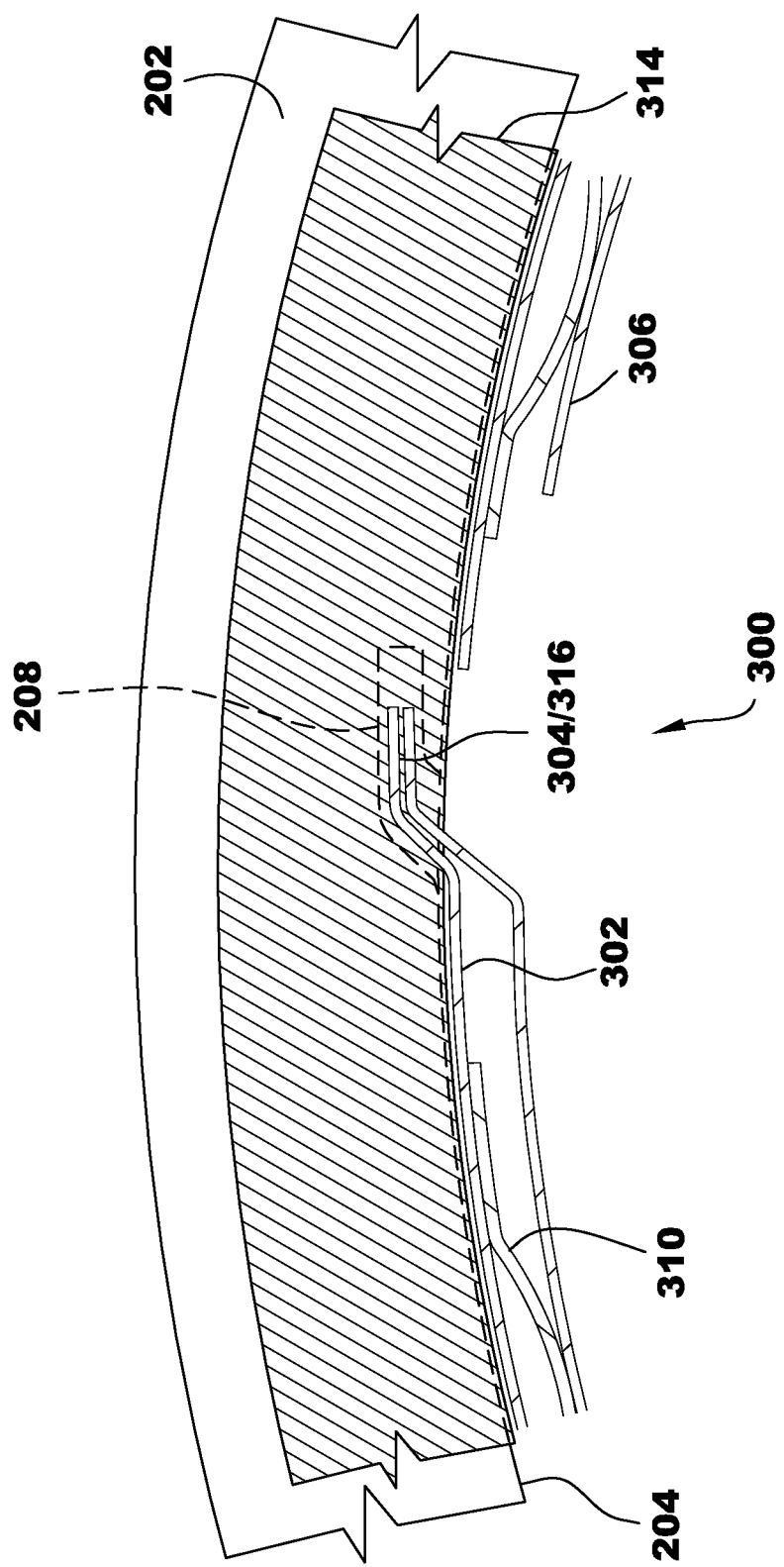
FIG. 10 is an enlarged view of the foil bearing assembly shown in FIG. 9.

The foil bearing assembly 300 of the embodiment illustrated in FIG. 6 further includes a single foil retaining clip 314 positioned adjacent the ends of the layers 302/306/310 opposite the foil retaining lip 214 to inhibit axial movement of the layers 302/306/310 within the cylindrical bore 206 of the sleeve 202. In this embodiment, the foil retaining clip 314 snaps into a circumferential groove 212 formed within the radial inner surface 204 of the cylindrical bore 206 near a motor end 218 of the cylindrical bore 206. FIG. 9 and FIG. 10 further illustrate the arrangement of the foil retaining clip 314 at one end of the foil bearing assembly 300. The foil retaining clip 314 is sized and dimensioned to provide clearance for the outer foil assembly 302, and to overlap with at least one bearing retention feature 304 that forms a radially outward projecting axial tab 316, as described further below.

The foil retaining lip 214 may be positioned within any region of the cylindrical bore 206 near the impeller end 216 including, without limitation, a position immediately adjacent to the opening of the cylindrical bore 206 at the impeller end 216. Alternatively, the foil retaining lip 214 may be positioned within any region of the cylindrical bore 206 near the motor end 218 including, without limitation, a position immediately adjacent to the opening of the cylindrical bore 206 at the motor end 218. In such embodiments, the foil retaining clip 314 snaps into a circumferential groove 212 formed within the radial inner surface 204 of the cylindrical bore 206 near the impeller end 216, in an arrangement that is essentially the opposite of the arrangement illustrated in FIG. 6.

Referring again to FIG. 6, the foil bearing assembly 300 is installed within the bearing housing 200 by inserting the foil bearing assembly 300 into the cylindrical bore 206 of the bearing housing 200 at the motor end 218. The foil bearing assembly 300 is then advanced axially into the cylindrical bore 206 toward the impeller end 216 until the layers 302/306/310 contact the foil retaining lip 214. The foil retaining clip 314 is then snapped into the circumferential groove 212 near the motor end 218 of the cylindrical bore 206 to lock the foil bearing assembly 300 in place. In other embodiments, any suitable method for affixing the foil bearing assembly 300 within the sleeve 202 may be used. Non-limiting examples of suitable methods include keepers and retaining clips, adhesives, set screws, and any other suitable affixing method.

Figure 11:
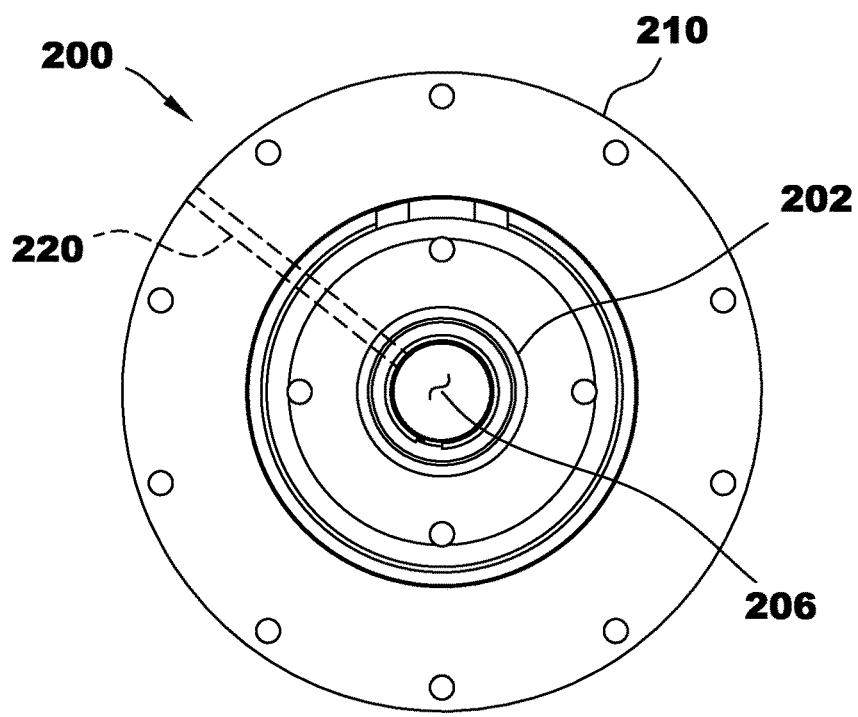
FIG. 11 is a rear view of the bearing housing shown in FIG. 7.
Figure 12:
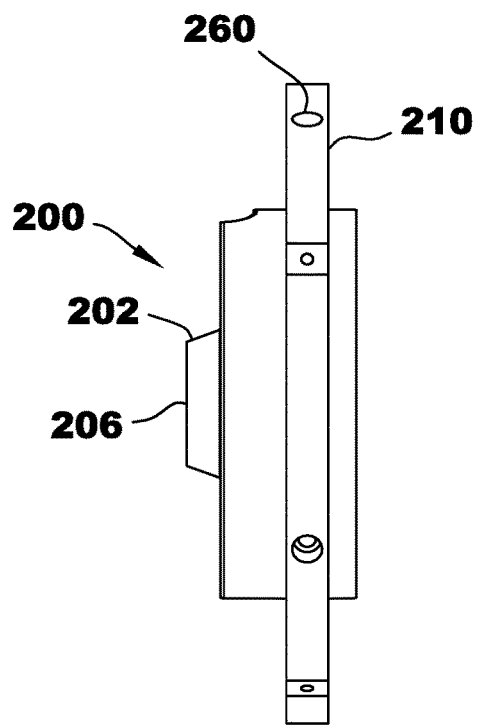
FIG. 12 is a side view of the bearing housing shown in FIG. 7.
Figure 13:
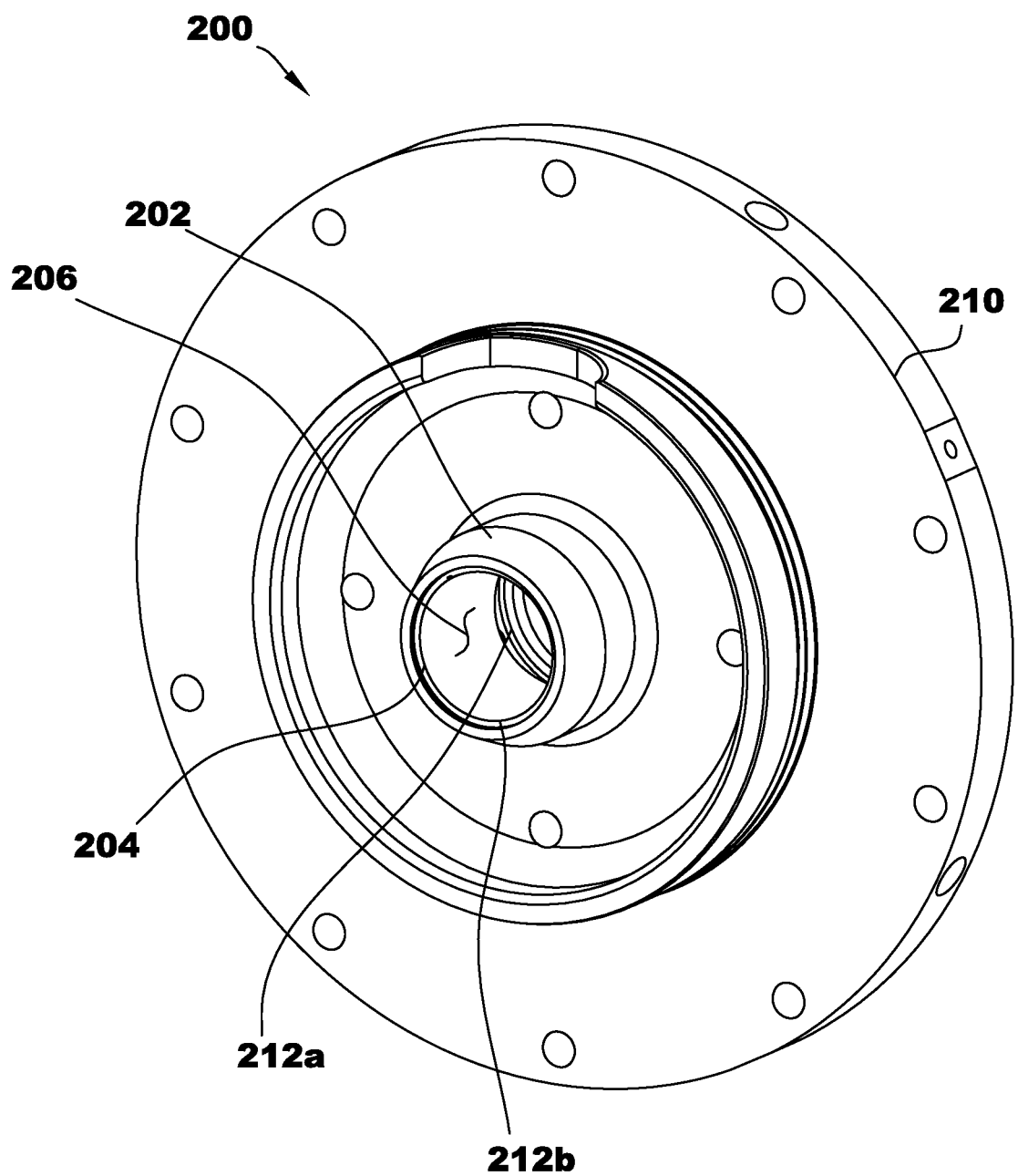
FIG. 13 is a perspective view of the bearing housing shown in FIG. 7.

Referring to FIG. 11, FIG. 12, and FIG. 13, the mounting structure 210 of each bearing housing 200 (only bearing housing 200 illustrated in FIG. 11, FIG. 12, and FIG. 13)/200a connects the respective bearing housing 200/200a to the compressor housing 102 (shown in FIGS. 1 and 2). In the illustrated embodiment, the mounting structure 210 generally projects in a radially outward direction to a dimension matched to the outer dimension of the compressor housing 102. The bearing housing 200 may include any form of mounting structure 210 including, without limitation, an annular flange. The bearing housings 200/200a may further serve as a mounting structure for a variety of elements including, but not limited to, radial bearings, such as the foil bearing assembly 300 described above, a thrust bearing, and sensing devices (not shown) used as feedback for passive or active control schemes such as proximity probes, pressure transducers, thermocouples, key phasers, and the like. The bearing housing 200 may further include external coolant conduits or channels 220 (shown in FIG. 11) to enable active cooling of the foil bearing assembly. The coolant channels 220 can extend, for example, radially outward from the cylindrical bore 206 to an opening 260 formed at a radial outer edge 222 of the bearing housing 200/200a (see also FIG. 7) and can deliver coolant from an external source and/or from the refrigerant system flow to the bearing housing 200/200a and foil bearing assembly 300. Additional details of coolant channels and coolant delivery methods suitable for use with the compressor 100 are described, for example, in U.S. patent application Ser. No. 16/809,836, filed Mar. 5, 2020, the disclosure of which is hereby incorporated by reference in its entirety.

Figure 14:
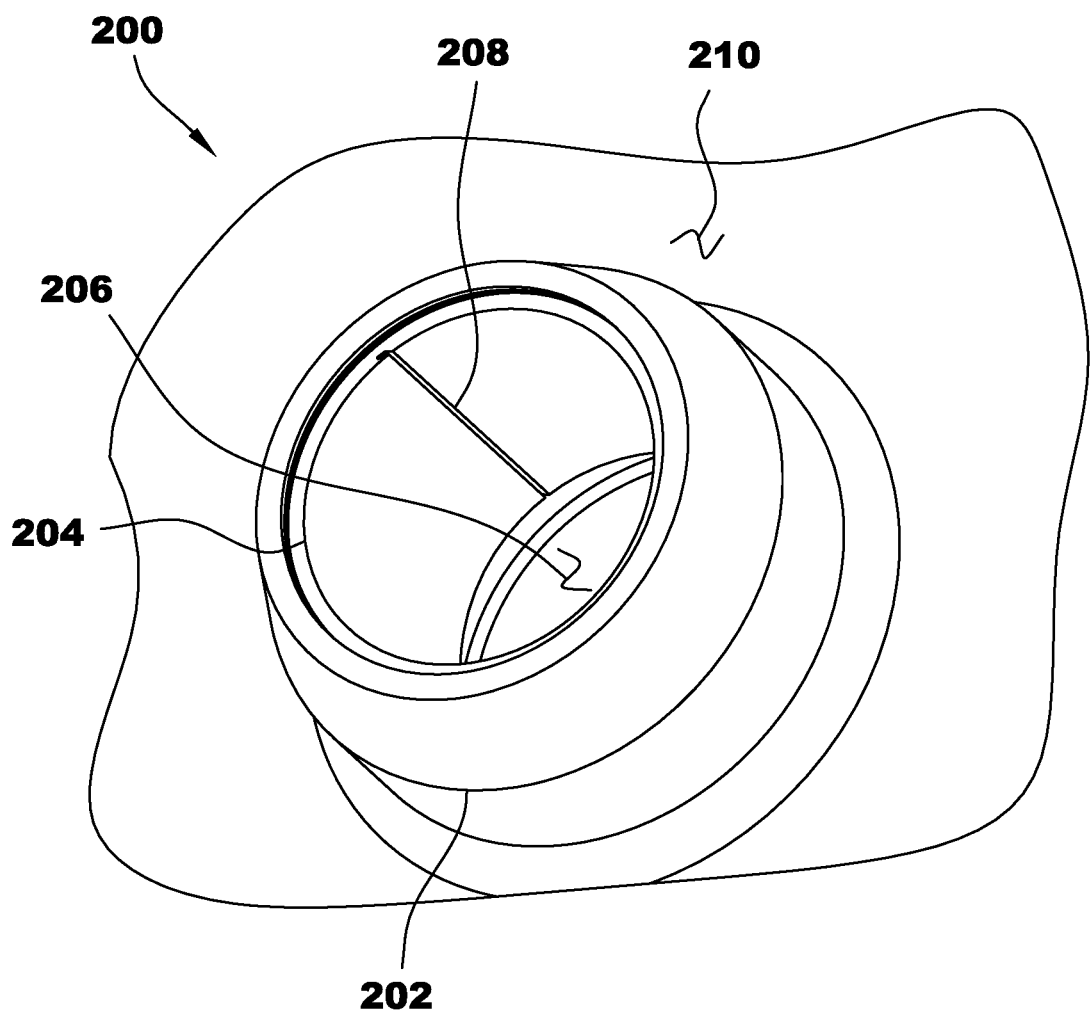
FIG. 14 is an enlarged view of the sleeve of the bearing housing shown in FIG. 10, illustrating the bearing assembly locking feature.

Referring to FIG. 13 and FIG. 14, the bearing housing sleeve 202 has a radial inner surface 204 that defines the cylindrical bore 206. The cross-sectional profile of the cylindrical bore may be essentially circular or may be any other rounded or polygonal shape without limitation, such as elliptical, square, octagonal, and the like. The radial inner surface 204 is sized and dimensioned to receive the foil bearing assembly 300 such that the outer foil assembly 302 of the foil bearing assembly 300 contacts the radial inner surface 204.

Referring to FIG. 13, the radial inner surface 204 is provided with at least one or more additional features to enable retaining the foil bearing assembly in a fixed axial and rotational position within the sleeve 202. In some embodiments, for example, a first circumferential groove 212a and a second circumferential groove 212b are formed within the radial inner surface 204. The first and second circumferential grooves 212a/212b are sized and dimensioned to receive foil retaining clips 314a and 314b, respectively, as illustrated in FIG. 5. In other embodiments, the first circumferential groove 212a may be replaced by a circumferential foil retaining lip 214 (see FIG. 6).

Referring to FIG. 14, the radial inner surface 204 of the bearing housing 200 is further provided with at least one bearing assembly locking feature 208. The bearing assembly locking feature 208 interlocks with one or more bearing retention features provided on the foil bearing assembly 300 as described below. The bearing assembly locking feature 208 may be any suitable form of mechanically interlocking feature without limitation. Non-limiting examples of suitable mechanically interlocking features include raised features such as an axial ridge, key, or tab, and axial depressions formed within the radial inner surface 204 such as an axially-extending slot, an axially-extending keyhole or keeper as illustrated in FIG. 14. The bearing housing 200 illustrated in FIG. 14 includes a single bearing assembly locking feature 208, though it should be understood that the bearing housing 200 can include more than one bearing assembly locking feature 208. In some embodiments, for example, the radial inner surface 204 of the bearing housing 200 defines a plurality of axially-extending grooves spaced circumferentially along the radial inner surface, each one of the axially-extending grooves sized and shaped to receive a corresponding bearing retention feature of the foil bearing assembly 300.

Figure 15:
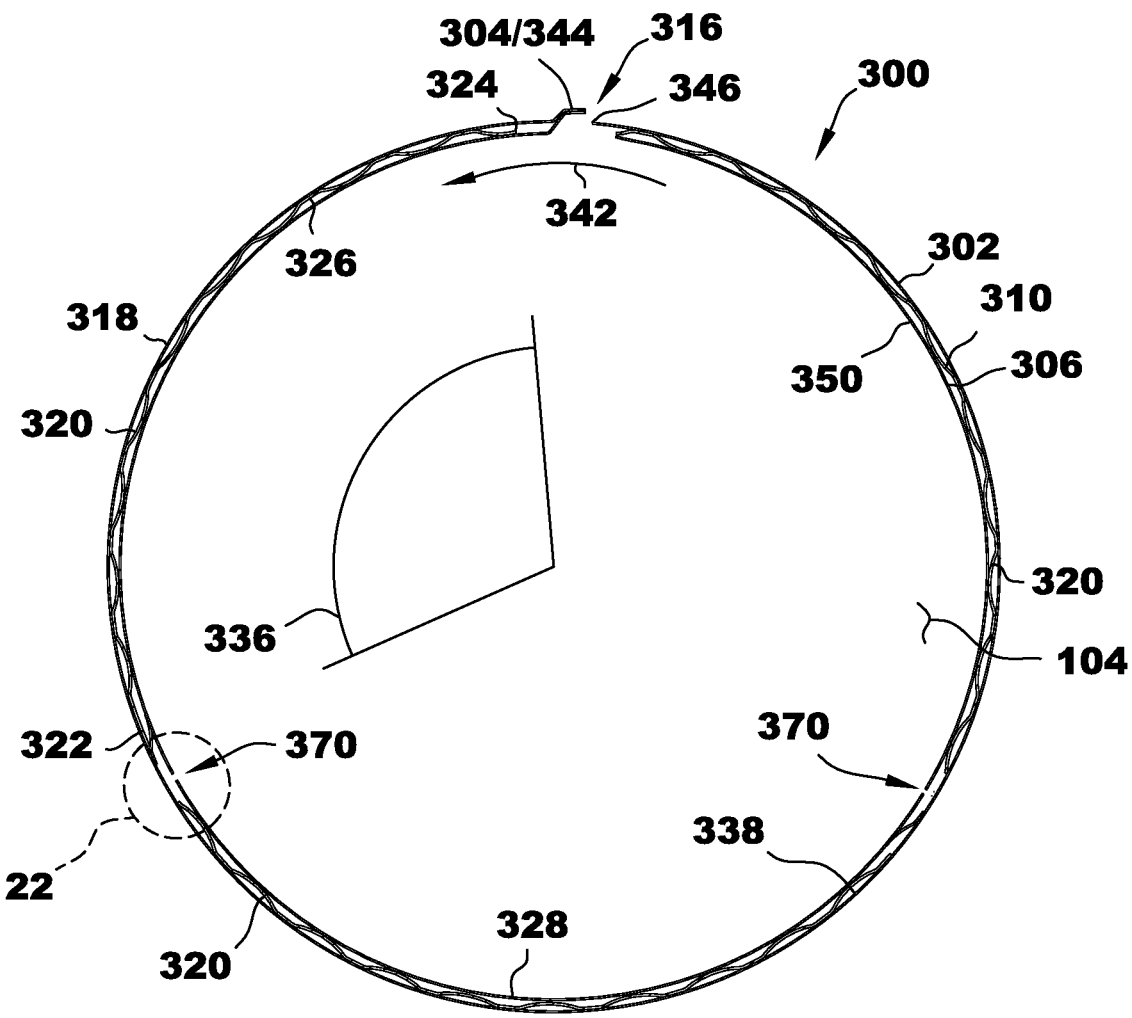
FIG. 15 is a front cross-sectional view of the foil bearing assembly shown in FIG. 8 with the foil keeper and foil retaining clip removed.
Figure 16:
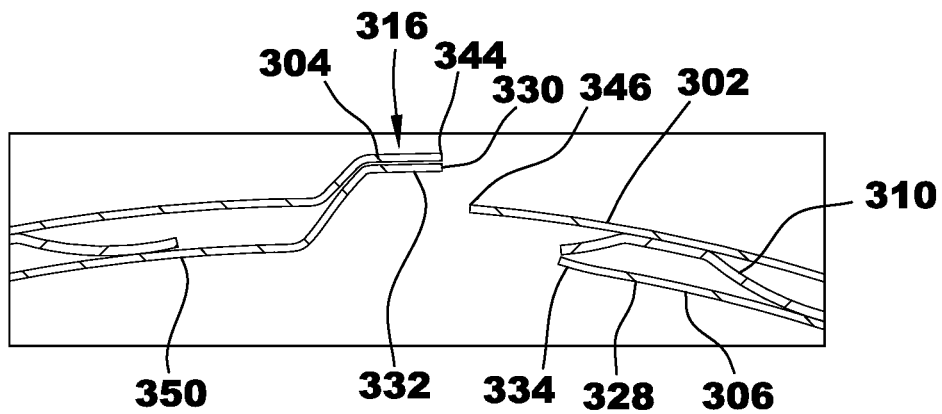
FIG. 16 is an enlarged view of the foil bearing assembly shown in FIG. 15, illustrating various features of the foil bearing assembly in more detail.

Referring to FIGS. 15 and 16, the foil bearing assembly 300 further includes at least one bearing retention feature 304 to cooperatively engage the bearing assembly locking feature 208 to maintain the foil bearing assembly within the bearing housing at a fixed rotational position within the cylindrical bore 206 of the sleeve 202. That is, the bearing retention feature 304 and the bearing assembly locking feature 208 are sized and shaped complementary to one another such that when the bearing retention feature 304 is engaged with the bearing assembly locking feature 208, the bearing assembly locking feature 208 inhibits or limits at least rotational movement of the bearing retention feature 304. The bearing retention feature 304 may include any suitable form of mechanically interlocking feature without limitation. In some embodiments, the at least one bearing retention feature 304 is selected based on the choice of bearing assembly locking feature 208 provided within the cylindrical bore 206. Non-limiting examples of suitable mechanically interlocking features include raised features such as an axial ridge, key, or tab, as well as axial depressions formed within at least the outer foil assembly 302 of the foil bearing assembly 300 such as an axial slot, an axial keyhole or keeper.

The foil bearing assembly 300 of the illustrated embodiment includes a single bearing retention feature 304 formed along an edge of the outer foil assembly 302. The bearing retention feature defines an axial tab 316 sized and dimensioned to interlock with the bearing assembly locking feature 208, provided in the form of an axial slot, as illustrated in FIG. 14. In other embodiments, the foil bearing assembly 300 may include additional bearing retention features 304 formed, for example, along an edge of the inner foil assembly 306. In such embodiments, the bearing retention features 304 formed along the outer and inner foil assemblies 302, 306 may be positioned adjacent one another and/or joined together (e.g., by welding) to define the axial tab 316.

The foil bearing assembly 300 may be provided in any suitable form without limitation. For example, the foil bearing assembly 300 may be provided with two layers, three layers, four layers, or additional layers without limitation.

The outer foil assembly 302 includes at least one outer foil pad 318 circumferentially disposed about the bump foil assembly 310 and the inner foil assembly 306. In the example embodiment illustrated in FIGS. 1-16, the outer foil assembly 302 includes a single outer foil pad 318 constructed of a single, unitary foil. In other embodiments, the outer foil assembly 302 may be constructed of multiple outer foil pads. The outer foil assembly 302 can provide a smooth inner surface for support of the adjacent bump foil assembly 310 for efficient transmission of transient motions caused by radial forces exerted by the shaft 104 to the inner foil assembly 306 during operation of the compressor 100. The outer foil assembly 302 provides this smooth inner surface independently of the surface smoothness of the underlying radial inner surface 204 of the cylindrical bore 206 of the bearing housing 200. Thus, in some embodiments, use of the outer foil assembly 302 facilitates increasing the surface specification of the radial inner surface 204 of the cylindrical bore 206 or, stated another way, reducing a surface smoothness requirement of the radial inner surface 204. In some embodiments, the foil bearing assembly 300 is suitable for use with a bearing housing 200 in an "as-cast" condition without need for further machining, grinding, or any other means to smooth the radial inner surface 204 of the cylindrical bore 206 of the bearing housing 200. Accordingly, in some embodiments, the radial inner surface 204 of the cylindrical bore 206 is an as-cast surface. That is, the radial inner surface 204 of the cylindrical bore 206 is a surface of a cast bearing housing 200 that has not undergone post-cast machining, grinding, or similar means to smooth the radial inner surface 204.

The outer foil assembly 302 can also improve thermal management of the foil bearing assembly 300 and facilitate reducing space requirements of the foil bearing assembly 300, as described for example in U.S. patent application Ser. No. 16/809,836, filed Mar. 5, 2020, the disclosure of which is hereby incorporated by reference in its entirety.

The bump foil assembly 310 of the foil bearing assembly 300 may be formed from a radially elastic structure to provide a resilient surface for the spinning shaft 104 during operation of the compressor 100. The bump foil assembly 310 may be formed from any suitable radially elastic structure without limitation including, but not limited to, an array of deformable bumps or other features designed to deform and rebound under intermittent compressive radial loads, and any other elastically resilient material capable of compressing and rebounding under intermittent compressive radial loads. The bump foil assembly 310 may be connected to at least one adjacent layer including, but not limited to at least one of the outer foil assembly 302 and the inner foil assembly 306. In some embodiments, the bump foil assembly 310 may be connected to both the outer foil assembly 302 and the inner foil assembly 306. In other embodiments, the bump foil assembly 310 may be free-floating and not connected to any layer of the foil bearing assembly 300.

As shown in FIG. 15, the bump foil assembly 310 of the example embodiment includes a plurality of bump foils 320 spaced circumferentially about the foil bearing assembly 300. The bump foil assembly 310 illustrated in FIG. 15 includes three bump foils 320, though the bump foil assembly 310 may include any other suitable number of bump foils 320 that allows the foil bearing assembly 300 to function as described herein, including, for example and without limitation, one, two, four, or more bump foils. Each bump foil 320 extends axially the entire length or substantially the entire length of the foil bearing assembly 300 and extends circumferentially from a first edge 322 to a second edge 324. Each bump foil 320 extends or subtends an arc angle 336 of approximately 110° from the first edge 322 to the second edge 324 in the illustrated embodiment, although the bump foils 320 may extend greater than or less than 110° around the foil bearing assembly 300 in other embodiments.

Figure 17:
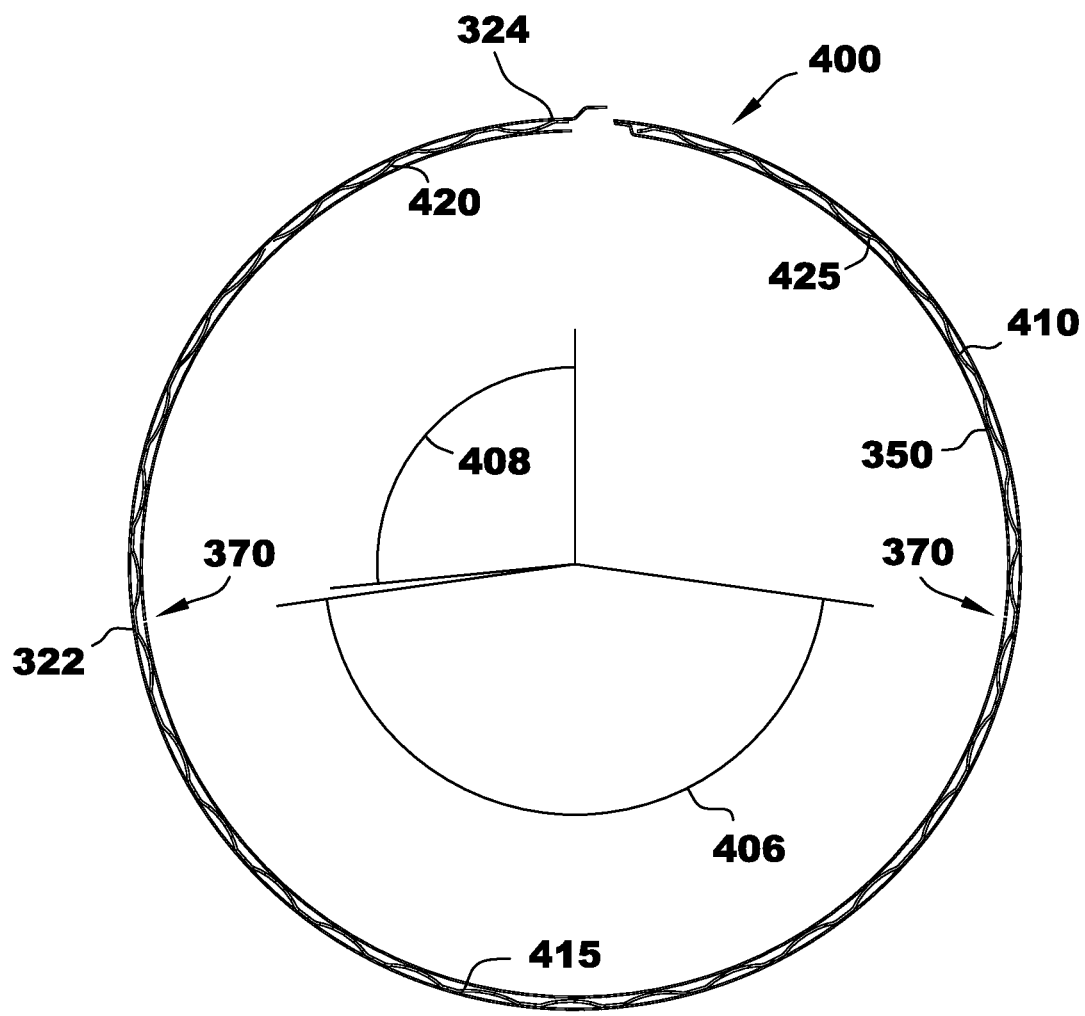
FIG. 17 is a front cross-sectional view of another foil bearing assembly suitable for use with the compressor of FIG. 1.

Additionally, the bump foils 320 can have different arc angles from one another. FIG. 17, for example, illustrates a foil bearing assembly 400 including a bump foil assembly 410 with bump foils 415, 420, 425 having different arc angles 406, 408. In particular, the bump foil assembly 410 of FIG. 17 includes a major bump foil 415 that has an arc angle 406 greater than the arc angle 408 of the other bump foils 420, 425. In this embodiment, the major bump foil 415 has an arc angle 406 of approximately 160°, and the other bump foils 420, 425 have arc angles 408 of approximately 95°. In other embodiments, the major bump foil 415 can have an arc angle 406 in the range of 120° to 360°, in the range of 120° to 270°, in the range of 120° to 240°, in the range of 120° to 200°, in the range of 120° to 180°, in the range of 120° to 150°, in the range of 150° to 360°, in the range of 150° to 270°, in the range of 150° to 240°, in the range of 150° to 200°, or in the range of 150° to 180°. In other embodiments, the bump foil assembly 310 may include a single bump foil that extends circumferentially around the entirety or substantially the entirety of the foil bearing assembly 300.

The inner foil assembly 306 includes at least one inner foil pad 328. In the example embodiments illustrated in FIGS. 1-17, the inner foil assembly 306 includes a single inner foil pad 328 constructed of a single, unitary foil. In other embodiments, the inner foil assembly 306 may be constructed of a plurality of separate or segmented inner foil pads spaced circumferentially about the foil bearing assembly 300. In such embodiments, the inner foil assembly 306 can include any suitable number of inner foil pads that enables the foil bearing assembly 300 to function as described herein. Such embodiments are described, for example, in U.S. patent application Ser. No. 17/167,611, filed Feb. 4, 2021, the disclosure of which is hereby incorporated by reference in its entirety. The inner foil pad 328 is arcuate and extends circumferentially from a first end 330 including a tab 332 to a second, free end 334. The inner foil pad 328 defines a cylindrical inner surface 350 disposed for engagement with the surface of the shaft 104. The cylindrical inner surface 350 defines a plurality of openings or perforations 370 extending radially therethrough. As described in greater detail herein, the openings 370 extending through the inner foil assembly 306 facilitate reducing sub-synchronous vibrations, for example, by providing improved damping and reduced cross-coupled stiffness throughout the foil bearing assembly 300. The cross-sectional views shown in FIGS. 15-17 are taken through the plurality of openings 370, as indicated by dashed line 500 in FIG. 20.

In the embodiment illustrated in FIGS. 15 and 16, the inner foil pad 328 is connected to the outer foil assembly 302. The tab 332 of the inner foil pad 328 extends radially outward from an end of the inner foil pad 328 and into engagement with the outer foil assembly 302. In the embodiment illustrated in FIG. 15, the tab 332 is nested within the bearing retention feature 304 of the outer foil assembly 302 and is not connected or fixed to the outer foil assembly 302. In further embodiments, the inner foil pad 328 can be welded to the outer foil assembly 302 along the tab 332. The tab 332 may be welded to the outer foil assembly 302 using suitable welding techniques, such as resistance or spot welding, and laser welding. In other embodiments, the inner foil pad 328 may be connected to the outer foil assembly 302 using any other suitable fastening means. The inner foil pad 328 can be welded or otherwise connected to the outer foil assembly 302 at any suitable location that enables the foil bearing assembly 300 to function as described herein. In some embodiments, the inner foil pad 328 is secured or fixed to the foil bearing assembly 300 only along the tab 332 such that the free end 334 of the inner foil pad 328 is free to move or deflect. The free end 334 of the inner foil pad 328 can improve damping characteristics of the inner foil assembly 306, for example, by allowing greater deflection or freedom of movement of the inner foil assembly 306.

Figure 18:
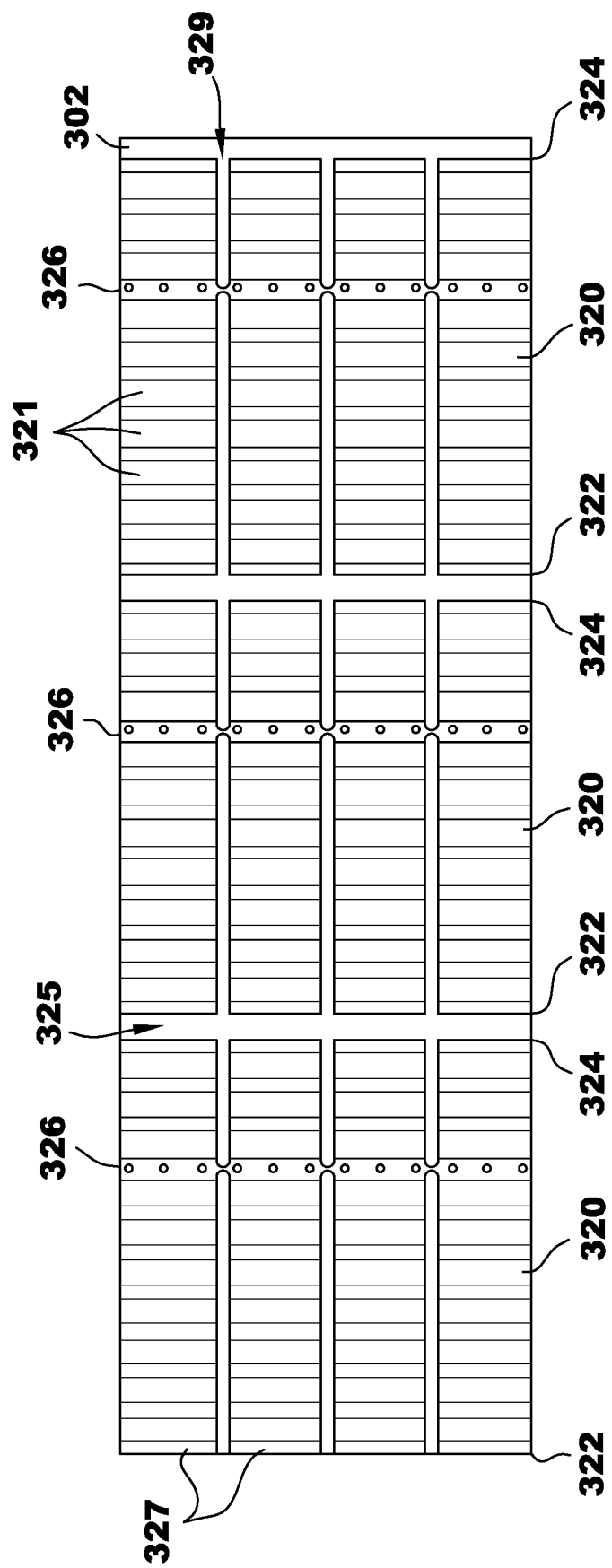
FIG. 18 is an interior view of a bump foil assembly and an outer foil assembly of the foil bearing assembly shown in FIG. 15 prior to being formed into a cylinder.
Figure 19:
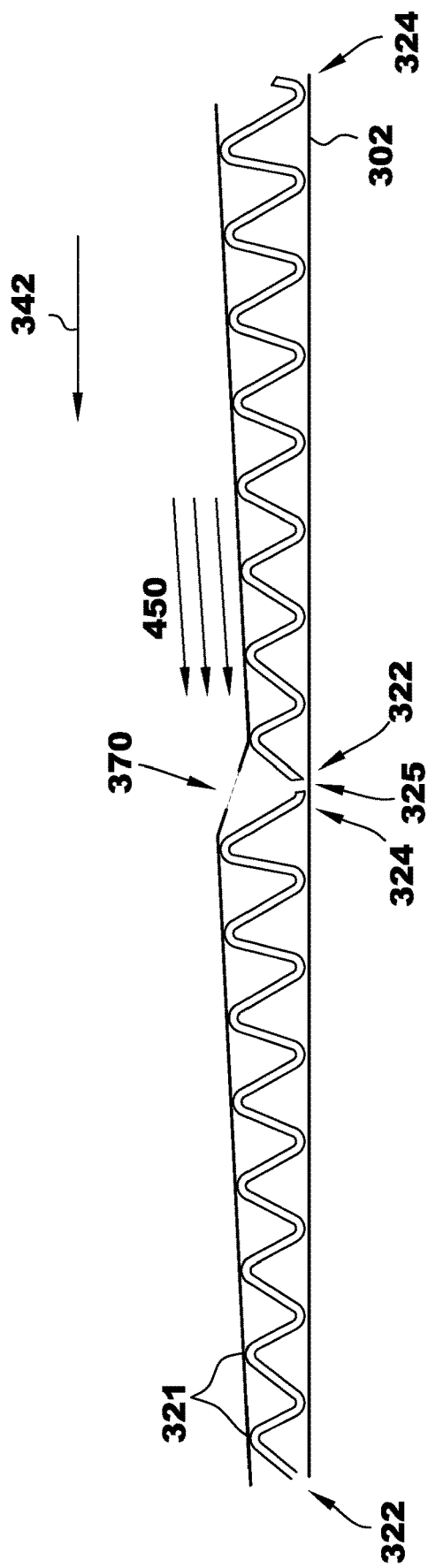
FIG. 19 is a side view of the outer foil assembly, the bump foil assembly, and an inner foil assembly of the foil bearing assembly shown in FIG. 15 prior to being formed into a cylinder.

FIG. 18 is an interior view of the bump foil assembly 310 and the outer foil assembly 302 prior to assembly into the foil bearing assembly 300. Each bump foil 320 is constructed from a plurality of bump foil strips 327 extending between the first edge 322 and the second edge 324 of the bump foil 320. In the illustrated embodiment, each bump foil 320 is constructed from four bump foil strips 327. Further embodiments can include any suitable number of bump foil strips 327, for example but without limitation, one, two, three, five, or more bump foil strips 327. Each bump foil strip 327 is spaced axially from the adjacent bump foil strip 327 to define an axial gap 329 therebetween. Each bump foil strip 327 comprises a plurality of bumps 321 disposed between the first edge 322 and the second edge 324. In the embodiment illustrated in FIG. 19, a height of each of the plurality of bumps 321 increases between the first edge 322 and the second edge 324 of the bump foil 320, such that the shortest bump 321 is proximate the first edge 322 and the tallest bump 321 is proximate the second edge 324. In further embodiments, the height of each of the plurality of bumps 321 may vary in any other suitable configuration, or, alternatively, each of the plurality of bumps 321 may have substantially the same height. In some embodiments, the height of each of the plurality of bumps 321 increases in a direction opposite a direction of rotation of the shaft 104. For example, and with reference to FIG. 15, the shaft 104 is configured for rotation about a rotational axis of the shaft 104 in a first direction 342. The height of each of the plurality of bumps 321 increases in a second direction opposite the first direction 342, from the first edge 322 to the second edge 324 of the bump foil 320. In further embodiments, the height of each of the plurality of bumps 321 may increase in the same direction as the direction of rotation of the shaft 104.

Each bump foil 320 includes an axially extending land 326 located between the first edge 322 and the second edge 324. The bump foils 320 are secured to one or both of the outer foil assembly 302 and the inner foil assembly 306. In some embodiments, for example, each of the bump foils 320 is welded to the outer foil assembly 302 along a respective land 326, such that each respective land 326 interconnects the bump foil strips 327 of each bump foil 320. The embodiment illustrated in FIG. 18 shows bump foils 320 with seven bumps 321 to the left of the land 326 and three bumps 321 to the right of the land 326. Other embodiments may have any number of bumps on either side of the land that allows the foil bearing assembly to function as described herein.

Figure 20:
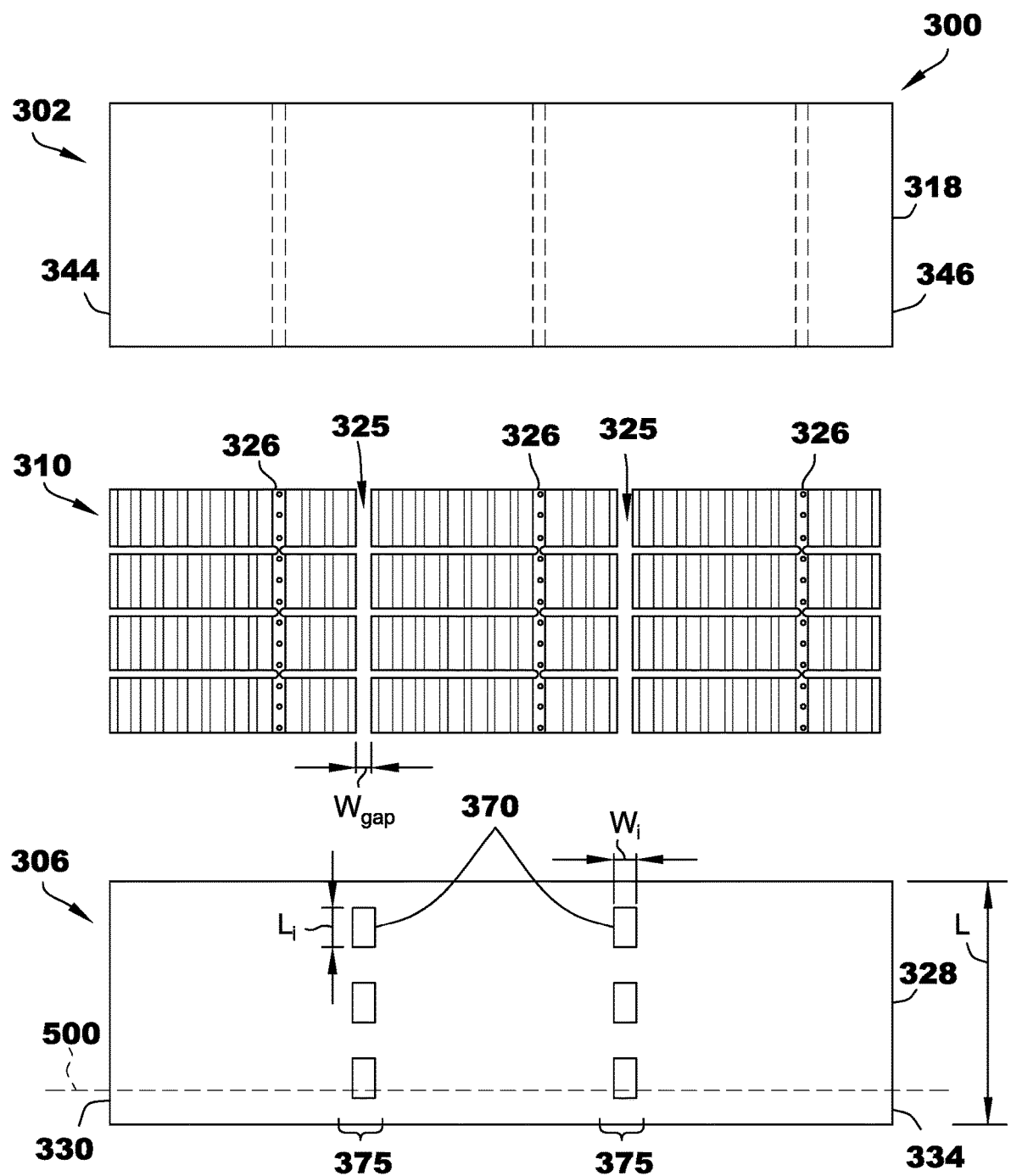
FIG. 20 is an interior view of the outer foil assembly, the bump foil assembly, and the inner foil assembly of the foil bearing assembly shown in FIG. 15, prior to assembly, illustrating a plurality of perforations or openings formed along the inner foil assembly.

FIG. 20 is an interior view of the foil bearing assembly 300 prior to assembly. During assembly of the foil bearing assembly 300, the three foil assemblies 302, 310, 306 are axially aligned and formed into a cylinder. FIG. 20 illustrates each of the three foil assemblies 302, 310, 306 at a different axial position for clarity. In the illustrated embodiment, the outer foil assembly 302 includes a single outer foil pad 318 extending from a first end 344 to a second end 346. The bump foil assembly 310 is positioned between the outer foil assembly 302 and the inner foil assembly 306 and includes three bump foils 320 in the illustrated embodiment. As installed, the bump foil assembly 310 is disposed circumferentially about the inner foil assembly 306, with each bump foil 320 spaced circumferentially from the adjacent bump foil 320 to define a gap 325 therebetween, the gap 325 having a width $W_{gap}$.

The inner foil assembly 306 of the first example embodiment comprises a single inner foil pad 328 disposed radially inward from the outer foil assembly 302 and the bump foil assembly 310. The cylindrical inner surface 350 of the inner foil assembly 306 extends axially a length L from a first edge of the inner foil assembly 306 to an opposite second edge of the inner foil assembly 306. As noted above, the cylindrical inner surface 350 defines a plurality of openings or perforations 370 extending radially therethrough. In the illustrated embodiment, each opening 370 of the plurality of openings 370 is radially aligned with one of the gaps 325 between adjacent bump foils 320, and axially aligned with one of the axial gaps 329 between adjacent bump foil strips 327. The plurality of openings 370 may include at least one subset 375 of openings 370, where each opening 370 in the subset 375 is axially aligned with the other openings 370 of the subset 375. The embodiment illustrated in FIG. 20 includes two subsets 375 of axially aligned openings 370, although other embodiments may include greater than or fewer than two subsets 375. Additionally, in the illustrated embodiment, each subset 375 includes three axially aligned openings 370. In other embodiments, one or more of the subsets 375 may include greater than or fewer than three openings 370, such as one opening, two openings, four openings, five openings, or six or more openings. The illustrated embodiment includes a total of six openings 370, although other embodiments may include greater than or fewer than six openings 370. For example, the embodiment illustrated in FIG. 21 includes two subsets 375 each having a single opening 370. Each opening is radially aligned with one of the gaps 325 defined between adjacent bump foils 320, and axially aligned with all three axial gaps In some embodiments, including the embodiments shown in FIGS. 20 and 21, each of the gaps 325 defined between adjacent bump foils 320 is radially aligned with one subset 375 of openings 370.

In other embodiments, the openings 370 may be located along the inner foil assembly 306 at a location other than radially aligned with one of the gaps 325 between adjacent bump foils 320. For example, in addition to or as an alternative to being radially aligned with gaps 325 between the bump foils 320, openings 370 can be radially aligned with the lands 326 of bump foils 320. In such embodiments, each subset 375 is radially aligned with one of the lands 326, and the land 326 of each bump foil 320 is radially aligned with one subset 375 of openings 370.

Each of the openings 370 may have any suitable size and shape that enables the foil bearing assembly 300 to function as described herein. In the illustrated embodiments, each opening 370 has the same opening shape. In other embodiments, different openings 370 may have different opening shapes. In some embodiments, the opening shape of each of the plurality of openings 370 is at least partially polygonal, including for example and without limitation, a rectangle, a triangle, a rhombus, or any other at least partially polygonal shape that enables the foil bearing assembly 300 to function as described herein. In other embodiments, the opening shapes may be fully or partially rounded, such as a circle, oval, teardrop, or any other fully or partially rounded shape that enables the foil bearing assembly 300 to function as described herein.

TABLE 1

Example Opening Dimensions for Inner Foil with a total foil area $A_{foil}$ of 9.312 in$^2$

| Example No. | No. of Openings | Width $W_i$ (in) | Length $L_i$ (in) | Opening Area $A_i$ (in$^2$) | Total Opening Area $A_{total}$ (in$^2$) | $A_{total}/A_{foil}$ |
|---|---|---|---|---|---|---|
| 1 | 6 | 0.100 | 0.300 | 0.0300 | 0.1800 | 1.93% |
| 2 | 6 | 0.150 | 0.300 | 0.0450 | 0.2700 | 2.90% |
| 3 | 6 | 0.125 | 0.300 | 0.0375 | 0.2250 | 2.42% |
| 4 | 6 | 0.075 | 0.300 | 0.0225 | 0.1350 | 1.45% |
| 5 | 6 | 0.050 | 0.300 | 0.0150 | 0.0900 | 0.97% |
| 6 | 6 | 0.025 | 0.300 | 0.0075 | 0.0450 | 0.48% |
| 7 | 4 | 0.025 | 0.556 | 0.0139 | 0.0556 | 0.60% |
| 8 | 4 | 0.050 | 0.556 | 0.0278 | 0.1113 | 1.19% |
| 9 | 4 | 0.075 | 0.556 | 0.0417 | 0.1669 | 1.79% |
| 10 | 4 | 0.125 | 0.556 | 0.0695 | 0.2781 | 2.99% |
| 11 | 4 | 0.150 | 0.556 | 0.0834 | 0.3338 | 3.58% |
| 12 | 2 | 0.025 | 1.325 | 0.0331 | 0.0663 | 0.71% |
| 13 | 2 | 0.050 | 1.325 | 0.0663 | 0.1325 | 1.42% |
| 14 | 2 | 0.075 | 1.325 | 0.0994 | 0.1988 | 2.13% |
| 15 | 2 | 0.125 | 1.325 | 0.1656 | 0.3313 | 3.56% |
| 16 | 2 | 0.150 | 1.325 | 0.1988 | 0.3975 | 4.27% |

Figure 21:
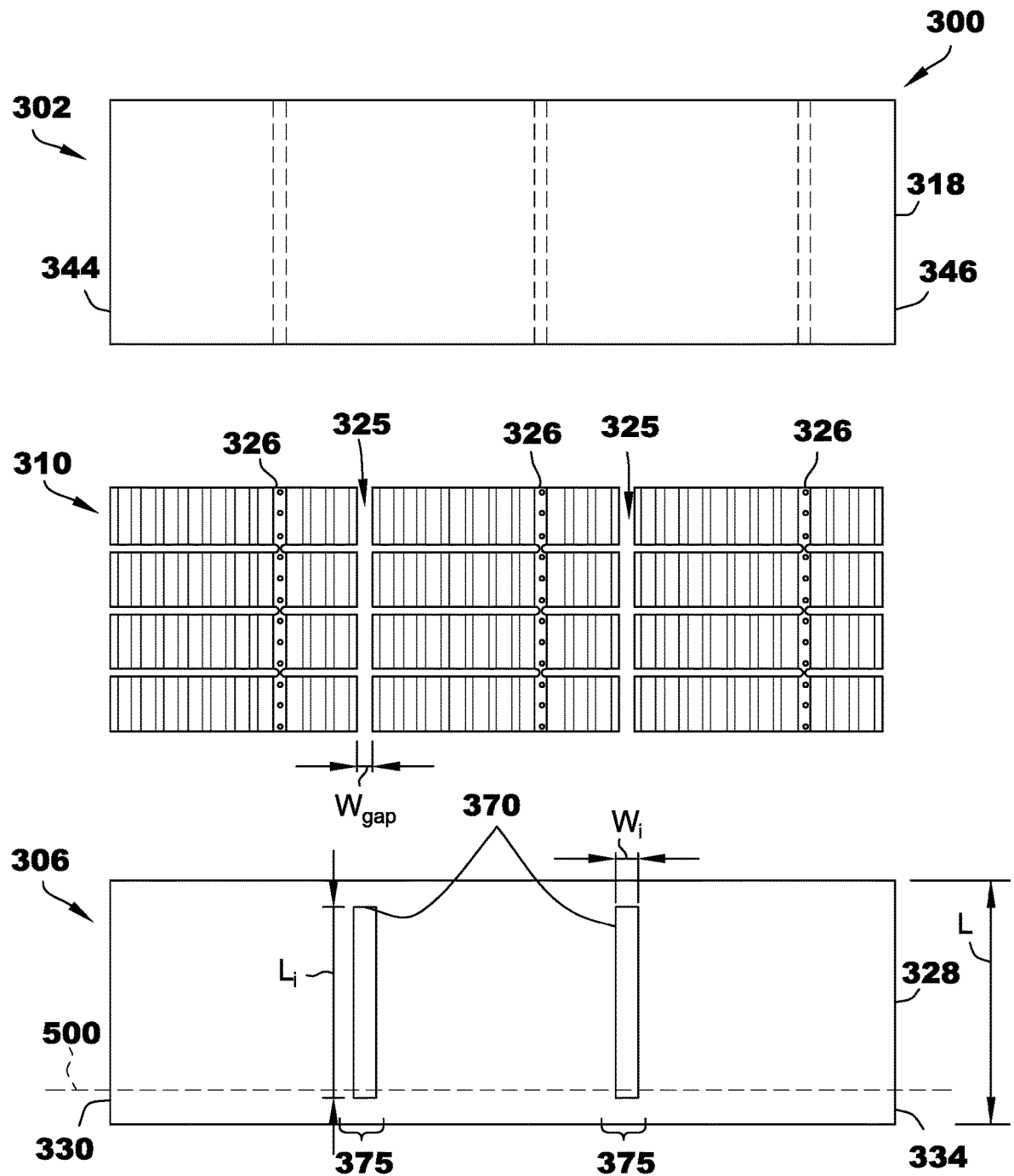
FIG. 21 is an interior view of the outer foil assembly, the bump foil assembly, and the inner foil assembly of the foil bearing assembly shown in FIG. 15, prior to assembly, illustrating an additional or alternative configuration of the perforations or openings formed along the inner foil assembly.

Table 1 shows the dimensions of several example configurations of openings 370 for an inner foil assembly 306 with a total foil area $A_{foil}$ of 9.312 square inches. The inner foil assemblies 306 of Examples 1-6 each include a total of six openings 370, with two subsets 375 each having three openings 370, as shown in FIG. 20. The inner foil assemblies 306 of Examples 7-11 include a total of four openings, with two subsets 375 each having two openings 370 (not shown). The inner foil assemblies 306 of Examples 12-16 each include a total of two openings 370, with two subsets 375 each having one opening 370, as shown in FIG. 21. Each opening 370 extends axially a length $L_i$ and extends circumferentially a width $W_i$. For example, in Example 1, the inner foil assembly 306 includes six openings 370 each having a width $W_i$ of 0.1 inches and a length $L_i$ of 0.3 inches. In the examples listed in Table 1, each opening 370 of the plurality of openings 370 has the same length $L_i$ and width $W_i$, but in further example embodiments, different openings 370 may have different lengths $L_i$ and/or widths $W_i$.

The sum of the lengths $L_i$ of the openings 370 in a subset 375 with N openings is a subset opening length $L_{sub}$, equal to $L_1 + \ldots + L_N$. In some embodiments, the ratio of the subset opening length $L_{sub}$ to the length L of the cylindrical inner surface 350 of the inner foil assembly 306 is between 0.288 and 0.312. In some embodiments, the ratio of the width $W_i$ of each of the openings 370 in one subset of openings 370 to the width $W_{gap}$ of the gap 325 with which the subset 375 is radially aligned is between 0.100 and 0.300.

Each opening 370 additionally has an opening area $A_i$. In the examples listed in Table 1, the opening area $A_i$ is equal to the product of the length $L_i$ and width $W_1$ of the opening 370. A total opening area $A_{total}$ can be defined as the sum of the opening areas $A_i$ of each of the plurality of openings 370. For example, Example 3 includes six openings 370, each having an opening area $A_i$ of 0.375 square inches, giving a total opening area $A_{total}$ of 0.225 square inches. In the Examples listed in Table 1, a ratio of the total opening area to the total foil area $A_{total}/A_{foil}$ ranges from approximately 0.3% to 4.3%. In further embodiments, the ratio $A_{total}/A_{foil}$ may fall within any other suitable range.

Figure 22:
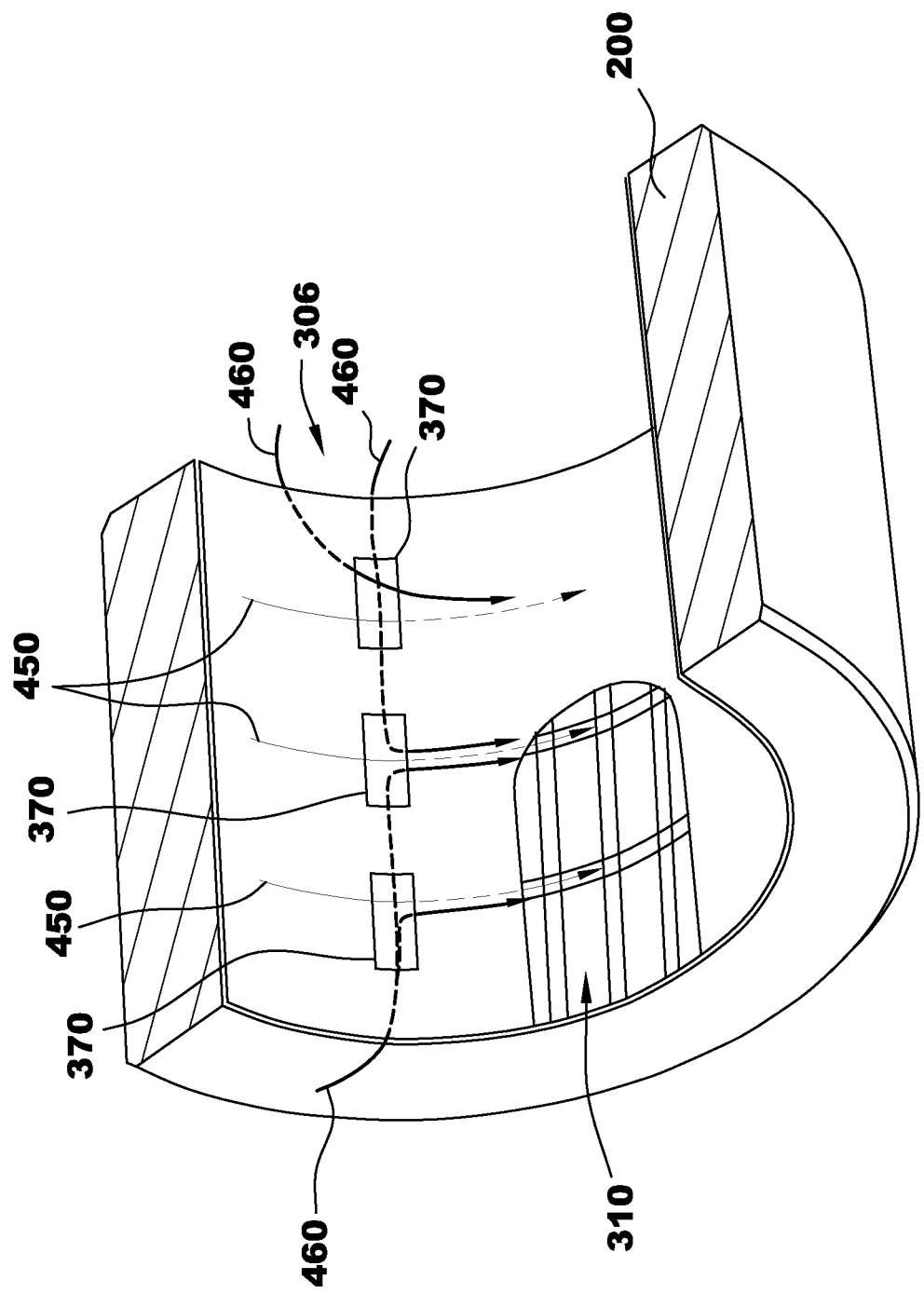
FIG. 22 is a cut-away perspective view of the foil bearing assembly shown in FIG. 15 installed in a bearing housing.
Figure 23:
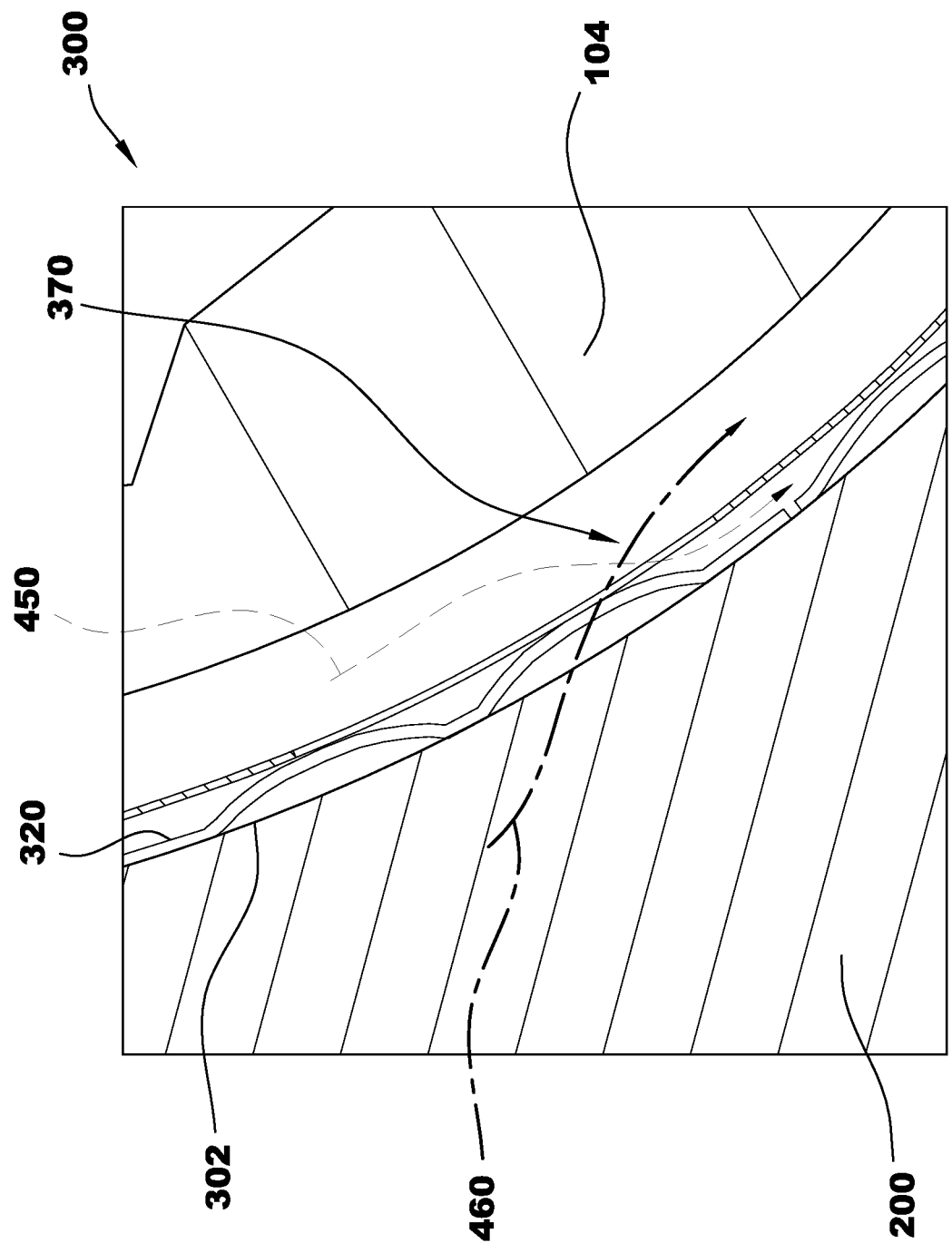
FIG. 23 is an enlarged cross-sectional view of a portion of the foil bearing assembly shown in FIG. 15.

The openings 370 defined along the cylindrical inner surface 350 of the inner foil assembly 306 facilitate reducing sub-synchronous vibrations within centrifugal compressors by providing improved damping and reduced cross-coupled stiffness, for example, by introducing axially extending discontinuities along the cylindrical inner surface 350. With reference to FIGS. 22 and 23, for example, the openings 370 defined along the cylindrical inner surface 350 of the inner foil assembly 306 are perpendicular to the fluid film swirling circumferentially around the shaft 104 (FIG. 22), and thereby disrupt the swirling flow (indicated by arrow 450) and introduce fresh gas (indicated by arrow 460) into the bearing assembly 300. Disrupting the otherwise continuous circumferential flow provides cooling and reduces cross-coupling within the foil bearing assembly 300. The polygonal shape and sharp corners of each opening 370 generate additional turbulence to disrupt the swirling fluid film. Drawing additional gas into the bearing film further reduces the risk of bearing starvation, and doing so without a pump reduces the complexity, weight, and cost of the bearing.

The openings 370 additionally allow gas to flow beneath the bump foil assembly 310 and reach every layer of the foil bearing assembly 300. With reference to FIG. 22, gas (indicated by dashed arrows) can flow through the openings 370, beneath each bump foil 320, and into contact with the outer foil assembly 302. This configuration provides cooling between each layer of the foil bearing assembly 300 and provides improved damping and reduced cross-coupled stiffness to the bearing as a whole. With additional reference to FIG. 19, aligning the openings 370 with the gaps 325 between adjacent bump foils 320 advantageously places the openings 370 between the tallest bump 321 at the second edge 324 of a bump foil 320 and the shortest bump 321 at the first end of the adjacent bump foil 320. During operation, the pressure generated by the hydrodynamic film causes the inner foil assembly to deflect outward and into engagement with the outer peak of each bump 321. Because the bump foils 320 vary in height, the cylindrical inner surface 350 is deflected into a non-cylindrical shape. When the shaft 104 rotates in the first direction 342 shown in FIG. 15, the openings 370 will be oriented obliquely relative to the first direction 342, and thus angled in the direction of the swirling hydrodynamic film 450 generated by the shaft 104, making it easier for the film 450 to flow through the opening 370 and facilitating its disruption.

The bearing housing and foil bearing assemblies of the present disclosure may be used as part of a method of assembling a compressor. The assembly method includes mounting the bearing housing to the compressor housing using the mounting structure of the bearing housing as described above. The assembly method also includes inserting a foil bearing assembly into the cylindrical bore and connecting the foil bearing assembly to the bearing housing by cooperatively engaging a bearing retention feature of the foil bearing assembly with the bearing assembly locking feature to maintain the foil bearing assembly within the bearing housing at a fixed rotational position as described above. In some embodiments, connecting the foil bearing assembly to the bearing housing includes connecting a plurality of separate pad modules, each having a separate bearing retention feature, to the bearing housing. The method further includes inserting at least one foil retaining clip into a circumferential groove formed within the inner surface of the cylindrical bore to retain the foil bearing assembly in a fixed axial position with respect to the cylindrical bore.

Embodiments of the systems and methods described achieve desired results as compared to prior systems and methods. For example, embodiments of the bearing systems facilitate reducing sub-synchronous vibrations (e.g., in centrifugal compressor systems) by incorporating perforated inner foil assemblies into foil bearings. The perforations formed along the inner foil assembly facilitate disrupting the fluid film swirling around the shaft, thereby reducing cross-coupling and increasing damping within the foil bearing assembly. Furthermore, the disclosed sizes and orientations of the perforations achieve the described benefits without reducing the load capacity of the bearing. That is, the hydrodynamic film can be disrupted without significantly reducing the hydrodynamic pressure within the bearing.

Example embodiments of bearing systems and methods, such as refrigerant compressors that incorporate the disclosed bearing system and methods of assembling compressors that include the disclosed bearing assembly, are described above in detail. The systems and methods are not limited to the specific embodiments described herein, but rather, components of the system and methods may be used independently and separately from other components described herein. For example, the bearing housing and bearing assemblies described herein may be used in compressors other than refrigerant compressors, such as turbocharger compressors and the like.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A bearing system comprising:
  a bearing housing including:
    a sleeve defining a cylindrical bore; and
    a mounting structure for connecting the bearing system to a compressor housing; and
  a foil bearing assembly positioned within the cylindrical bore and including:
    an inner foil assembly including a cylindrical inner surface; and
    a bump foil assembly positioned radially outward from the inner foil assembly, the bump foil assembly including a plurality of bump foils disposed circumferentially about the inner foil assembly, wherein each of the bump foils is spaced circumferentially from an adjacent bump foil to define a gap therebetween, wherein each of the bump foils comprises a plurality of bump foil strips extending from a first edge to a second edge, wherein each bump foil strip is spaced axially from an adjacent bump foil strip to define an axial gap therebetween;
  wherein the cylindrical inner surface of the inner foil assembly defines a plurality of perforations extending radially therethrough, wherein each of the plurality of perforations is radially aligned with one of the gaps between adjacent bump foils and is positioned at a common axial position with one of the axial gaps defined between adjacent bump foil strips.

2. The bearing system of claim 1, wherein each of the plurality of perforations has an at least partially polygonal shape.

3. The bearing system of claim 1, wherein each of the plurality of bump foils extends from a first edge to a second edge and comprises a plurality of bumps, each of the bumps having a height, and wherein the height of each of the plurality of bumps increases between the first edge and the second edge.

4. The bearing system of claim 1, wherein the plurality of perforations comprises at least one subset of perforations, wherein each of the perforations in the at least one subset of perforations is axially aligned with the other perforations in the at least one subset, and wherein each of the at least one subset of perforations is radially aligned with one of the gaps defined between adjacent bump foils.

5. The bearing system of claim 1, wherein the plurality of perforations comprises a single perforation radially aligned with one of the gaps defined between adjacent bump foils, and axially aligned with each of the axial gaps defined between adjacent bump foil strips.

6. The foil bearing assembly of claim 1, wherein each of the plurality of perforations has an opening area and the sum of the opening areas of each of the plurality of perforations is a total opening area, wherein the inner foil assembly has a total foil area, and wherein a ratio of the total opening area to the total foil area is between 0.48% and 4.27%.

7. The bearing system of claim 1, wherein each of the plurality of perforations has a width, and wherein a ratio of the width of each of the plurality of perforations to a width of the gap with which the perforation is radially aligned is between 0.100 and 0.300.

8. A foil bearing assembly comprising:
  an inner foil assembly including a cylindrical inner surface; and
  a bump foil assembly positioned radially outward from the inner foil assembly, the bump foil assembly including a plurality of bump foils disposed circumferentially about the inner foil assembly, wherein each of the bump foils is spaced circumferentially from an adjacent bump foil to define a gap therebetween, wherein each of the bump foils comprises a plurality of bump foil strips extending from a first edge to a second edge, wherein each bump foil strip is spaced axially from an adjacent bump foil strip to define an axial gap therebetween,
  wherein the cylindrical inner surface of the inner foil assembly defines a plurality of perforations extending radially therethrough, wherein each of the plurality of perforations is radially aligned with one of the gaps between adjacent bump foils and is positioned at a common axial position with one of the axial gaps defined between adjacent bump foil strips.

9. The foil bearing assembly of claim 8, wherein each of the plurality of perforations has an at least partially polygonal shape.

10. The foil bearing assembly of claim 8, wherein each of the plurality of bump foils extends from a first edge to a second edge and comprises a plurality of bumps, each of the bumps having a height, and wherein the height of each of the plurality of bumps increases between the first edge and the second edge.

11. The foil bearing assembly of claim 8, wherein the plurality of perforations comprises at least one subset of perforations, wherein each of the perforations in the at least one subset of perforations is axially aligned with the other perforations in the at least one subset, and wherein each of the at least one subset of perforations is radially aligned with one of the gaps defined between adjacent bump foils.

12. The foil bearing assembly of claim 8, wherein each of the plurality of perforations has an opening area and the sum of the opening areas of each of the plurality of perforations is a total opening area, wherein the inner foil assembly has a total foil area, and wherein a ratio of the total opening area to the total foil area is between 0.48% and 4.27%.

13. The foil bearing assembly of claim 8, wherein each of the plurality of perforations has a width, and wherein a ratio of the width of each of the plurality of perforations to a width of the gap with which the perforation is radially aligned is between 0.100 and 0.300.

14. A compressor comprising:
  a compressor housing;
  a shaft rotatably supported within the compressor housing;
  an impeller connected to the shaft and operable to impart kinetic energy to incoming refrigerant gas upon rotation of the shaft;
  a bearing housing mounted to the compressor housing and including a sleeve defining a cylindrical bore; and
  a foil bearing assembly rotatably supporting the shaft and positioned within the cylindrical bore, the foil bearing assembly including:
    an inner foil assembly including a cylindrical inner surface; and
    a bump foil assembly positioned radially outward from the inner foil assembly, the bump foil assembly including a plurality of bump foils disposed circumferentially about the inner foil assembly, wherein each of the bump foils is spaced circumferentially from an adjacent bump foil to define a gap therebetween, wherein each of the bump foils comprises a plurality of bump foil strips extending from a first edge to a second edge, wherein each bump foil strip is spaced axially from an adjacent bump foil strip to define an axial gap therebetween, wherein the cylindrical inner surface of the inner foil assembly defines a plurality of perforations extending radially therethrough, wherein each of the plurality of perforations is radially aligned with one of the gaps between adjacent bump foils and is positioned at a common axial position with one of the axial gaps defined between adjacent bump foil strips.

15. The compressor of claim 14, wherein each of the plurality of bump foils extends from a first edge to a second edge and comprises a plurality of bumps, each of the bumps having a height, and wherein the height of each of the plurality of bumps increases between the first edge and the second edge.

16. The compressor of claim 15, wherein the shaft is configured to rotate about a rotational axis of the shaft in a first direction, and wherein the height of each of the plurality of bumps increases between the first edge and the second edge of each bump foil in a second direction opposing the first direction.

17. The compressor of claim 16, wherein rotation of the shaft causes the cylindrical inner surface of the inner foil assembly to deflect such that at least one of the plurality of perforations is oriented obliquely relative to the first direction.

18. The compressor of claim 14, wherein the plurality of perforations comprises at least one subset of perforations, wherein each perforation in the at least one subset of perforations is axially aligned with the other perforations in the at least one subset, and wherein each of the at least one subset of perforations is radially aligned with one of the gaps defined between adjacent bump foils.

* * * * *